United States Patent
Han et al.

(10) Patent No.: US 9,344,308 B2
(45) Date of Patent: May 17, 2016

(54) SYSTEM AND METHOD FOR SIGNAL GENERATION

(71) Applicant: Cornell University, Ithaca, NY (US)

(72) Inventors: Ruonan Han, Ithaca, NY (US); Ehsan Afshari, Ithaca, NY (US)

(73) Assignee: Cornell University, Ithaca, NY (US)

(*) Notice: Subject to any disclaimer, the term of this patent is extended or adjusted under 35 U.S.C. 154(b) by 0 days.

(21) Appl. No.: 14/624,569

(22) Filed: Feb. 17, 2015

(65) Prior Publication Data
US 2015/0288393 A1    Oct. 8, 2015

(51) Int. Cl.
*H04B 7/06* (2006.01)
*H04L 27/04* (2006.01)
*H04B 1/04* (2006.01)

(52) U.S. Cl.
CPC ........ *H04L 27/04* (2013.01); *H04B 1/04* (2013.01); *H04B 7/0602* (2013.01)

(58) Field of Classification Search
CPC ..... H04B 1/0483; H04B 7/0602; H04L 27/04
See application file for complete search history.

(56) References Cited

U.S. PATENT DOCUMENTS

| 4,053,882 | A  | * | 10/1977 | Van Etten | ........... | 342/188 |
| 2002/0181605 | A1 | * | 12/2002 | Nation | ........... | 375/295 |
| 2004/0189404 | A1 | * | 9/2004 | Ravi et al. | ........... | 331/45 |
| 2004/0214547 | A1 | * | 10/2004 | Kim et al. | ........... | 455/296 |
| 2006/0087473 | A1 | * | 4/2006 | Song et al. | ........... | 342/194 |
| 2007/0173209 | A1 | * | 7/2007 | Kim et al. | ........... | 455/78 |
| 2007/0282482 | A1 | * | 12/2007 | Beucher et al. | ........... | 700/225 |
| 2013/0082785 | A1 | * | 4/2013 | Afshari et al. | ........... | 331/48 |
| 2013/0141175 | A1 | * | 6/2013 | Yin et al. | ........... | 331/96 |
| 2013/0266045 | A1 | * | 10/2013 | Lakkis | ........... | 375/219 |
| 2014/0043104 | A1 | * | 2/2014 | Chen | ........... | 331/46 |
| 2014/0266893 | A1 | * | 9/2014 | Rasheed et al. | ........... | 342/367 |

* cited by examiner

*Primary Examiner* — Jean B Corrielus
(74) *Attorney, Agent, or Firm* — Hodgson Russ LLP

(57) ABSTRACT

A high-power broadband radiation system and method are disclosed. The system includes an array of harmonic oscillators with mutual coupling through quadrature oscillators. Based on a self-feeding structure, the presently disclosed harmonic oscillators simultaneously achieve optimum conditions for fundamental oscillation and 2nd-harmonic generation. The signals at the second harmonic radiate through on-chip slot antennas, and are in-phase combined inside a hemispheric silicon lens attached at the backside of the chip. In some embodiments, the radiation of the system can also be modulated by narrow pulses generated on chip, thereby achieving broad radiation bandwidth.

14 Claims, 25 Drawing Sheets

$Z_{OUT} \approx Z_{IN} \approx 75\Omega$

TABLE 1

PERFORMANCE COMPARISON OF SUB-MILLIMETER-WAVE SIGNAL SOURCES IN CMOS

| References | Frequency (GHz) | Output Power (dBm) | EIRP (dBm) | Bandwidth | Phase Noise @ 1 MHz | DC Power (W) | Area (mm²) | CMOS Technology |
|---|---|---|---|---|---|---|---|---|
| [24] | 290 | -1.2† | - | 4.5% | -78 dBc/Hz | 0.32 | 0.36 | 65-nm Bulk |
| [25] | 280 | -7.2††† | 9.4 | 3.2 | - | 0.81 | 7.3 | 45-nm SOI |
| [10] | 260 | - | 5 | - | - | 0.69 | ~3 | 65-nm Bulk |
| [27] | 288 | -4.1††† | 3.13 | 0.7% | -87 dBc/Hz | 0.28 | 0.29 | 65-nm Bulk |
| [11] | 210 | - | - | >6.7% | - | 0.24 | 3.5 | 32-nm SOI |
| This Work | 260 | 0.5††† | 15.7 | 9.5% | -78.3 dBc/Hz | 0.8 | 2.3 | 65-nm Bulk |

†: Power measured through probing, not radiation    ††: wafer thinning is used
†††: Silicon lens is used (hyperspheric in [27], and hemispheric in this work)

Fig. 37

SYSTEM AND METHOD FOR SIGNAL GENERATION

STATEMENT REGARDING FEDERALLY SPONSORED RESEARCH

This invention was made with government support under contract no. 59980/A001 awarded by the National Science Foundation and 65831/A001 awarded by the Office of Naval Research. The government has certain rights in the invention.

CROSS-REFERENCE TO RELATED APPLICATIONS

This application claims priority to U.S. Provisional Application No. 61/940,823, filed on Feb. 17, 2014, now pending, the disclosure of which is incorporated herein by reference.

FIELD OF THE DISCLOSURE

The disclosure relates to terahertz signal generation.

BACKGROUND OF THE DISCLOSURE

Terahertz spectroscopy using silicon technology is gaining attraction for future portable and affordable material identification equipment. To do this, a broadband THz radiation source is critical. Unfortunately, the bandwidth of the prior CMOS works is limited. In a previous design, a 300 GHz signal source achieves 4.5% tuning range by changing the coupling among multiple oscillators. In another, the distributed active radiator ("DAR") array has 3% tuning range with radiation capability. Alternative to the continuous device-tuning method, THz time-domain spectroscopy utilizing the broadband spectrum of a pico-second pulse is widely used in optics community.

CMOS circuits working in the millimeter-wave and terahertz (THz) frequency range (100 GHz-1 THz) are receiving increased attention due to promising applications in the security, biomedicine, and communication areas. More particularly, recent works have demonstrated fully-integrated image sensors working up to 1 THz, and wireless data links over 200 GHz. For these applications, a signal source should advantageously generate high radiation power to overcome large propagation loss at this frequency range. Unfortunately, it is well known that a "terahertz gap" exists, which keeps the generated terahertz power low. This is because the relevant frequency range is too high for electronics, and too low for optics. In the context of CMOS technology, such difficulty is mainly attributed to three factors. First, despite the aggressive trend to scale down CMOS, the maximum frequency of oscillation, $f_{max}$, of a CMOS transistor is still below 300 GHz, especially when device interconnects are included. This sets a theoretical limitation, beyond which no fundamental oscillation nor power amplification is possible. Second, the thinner gate oxide in the advanced technology node results in lower breakdown voltage. This severely reduces the output power of the device, which is strongly correlated to the voltage swing. Third, the passive metal structures fabricated in CMOS have high loss, especially with the presence of the lossy silicon substrate. The challenge lies in the thin metal layers and the thick, lossy silicon substrate. Because of these drawbacks in CMOS, high-power terahertz generation is more commonly demonstrated in III-V compound semiconductors. For example, using InP high-electron mobility transistors ("HEMTs"), a 650-GHz power amplifier module with 3 mW output power was reported. In another previous work, 4.2 mW output power was demonstrated with a 600 GHz GaAs diode frequency tripler when cooled to 120 K (1.8 mW at room temperature).

In addition to the signal power level, another challenge in CMOS THz sources is the output frequency bandwidth. A broad bandwidth is especially important for material identification using THz spectroscopy. For example, prior research shows that many types of hazardous gas (e.g., methylchloride) and warfare chemical agents (e.g., sarin) exhibit vibrational resonance between 200 GHz and 300 GHz. To obtain such spectrum, a broadband radiation source is required.

To overcome the cutoff frequency limitation in CMOS, previous techniques utilize device nonlinearity and harmonic generation. Signal sources based on such principles can be further divided into two categories: (i) frequency multipliers; and (ii) harmonic oscillators. Frequency multipliers normally have both high output power and bandwidth. For example, in a previous work, a 180 GHz active doubler achieved 0 dBm output power and 11.1%-3-dB bandwidth. In other work, such performance metrics were achieved using a traveling-wave doubler at 275 GHz are −6.6 dBm and 7.8%. In a 480-GHz passive doubler from another work, the measured output power and frequency range were larger than −6.3 dBm and 4.2% (limited by testing equipment). However, these multipliers need a large-power and wide-tuning-range fundamental signal source to drive, which is another challenge. In comparison, the second nonlinear circuit category, i.e., the harmonic oscillator, has the advantage of being self-sustainable. The reported output power is competitive to that of the frequency doubler, especially with multi-cell power combining. For example, a 482-GHz triple-push oscillator achieved −7.9 dBm power. In another example, a coupled oscillator achieved −1.2 dBm. Normally, there is significant power loss in the process of radiation. Nevertheless, in another example, a 16-element 280 GHz distributed active radiator achieved a radiated power of −7.2 dBm and an EIRP (effective isotropic radiated power) of 9.4 dBm. Utilizing a pair of triple-push oscillators and a differential ring antenna, a high radiated power of −4.1 dBm at 288 GHz was reported. Despite such progress, large frequency tuning in harmonic oscillators remains very challenging. This is mostly due to the lossy MOS varactors used in the resonance tank. In a previous work, a variable-coupling solution effectively reduced such loss, and achieved a tuning range of 4.5%. Although producing the highest tuning range reported in prior CMOS THz oscillators, it remains insufficient for THz spectroscopy.

BRIEF SUMMARY OF THE DISCLOSURE

The present disclosure provides systems and methods for terahertz signal generation. A system for signal generation, comprises four quadrature oscillators, each quadrature oscillator configured to operate at a fundamental frequency. Each quadrature oscillator having a 00 phase output, a 90° phase output, a 180° phase output, and a 270° phase output. The system further comprises four radiator units, each radiator unit comprising an oscillator pair operating at the fundamental frequency. A first oscillator of the oscillator pair is connected to two of the quadrature oscillators at the 90° phase output and 270° phase output, respectively. A second oscillator of the oscillator pair is connected to the same two quadrature oscillators at the 0° phase output and the 180° phase output, respectively. The oscillator pair is configured to generate differential signals at a second harmonic of the fundamental frequency. Each radiator unit further comprises two antennas, each antenna in electrical communication with a corresponding oscillator of the oscillator pair. Each radiator unit has a switch connecting each oscillator of the oscillator pair to a respective antenna of the two antennas. The quadrature oscillators and radiator units form a ring of alternating quadrature oscillators and radiator units such that the oscillator pairs and quadrature oscillators are coupled.

A method for generating a broadband signal, comprises the step of generating a first phase signal and a second phase signal using a linking oscillator. The first and second phase signals have a same fundamental frequency and a phase of the first phase signal is different than a phase of the second phase signal. The first phase signal is provided to a first harmonic oscillator to couple the linking oscillator and the first harmonic oscillator. The second phase signal is provided to a second harmonic oscillator to couple the second harmonic oscillator and the linking oscillator. Each of the first and second harmonic oscillators produce a output signals at a harmonic of the fundamental frequency. The phases of the first and second phase signals are selected such that the output signals of the first and second harmonic oscillators are differential signals. The method may further comprise the step of pulse-modulating the output signals.

In an exemplary embodiment, a high-power broadband 260 GHz radiation source was implemented using 65-nm bulk CMOS technology. In an embodiment, the source is an array of eight harmonic oscillators with mutual coupling through four 130 GHz quadrature oscillators. Based on a self-feeding structure, the harmonic oscillator simultaneously achieves the optimum conditions for fundamental oscillation and 2nd-harmonic generation. In this embodiment, the signals at 260 GHz radiate through eight on-chip slot antennas, and are in-phase combined inside a hemispheric silicon lens attached at the backside of the chip. Similar to the laser pulse-driven photoconductive emitter in many THz spectrometers, the radiation of this source can also be modulated by narrow pulses generated on chip, which achieves broad radiation bandwidth. Without modulation, the chip achieves a measured continuous-wave radiated power of 1.1 mW, and an EIRP of 15.7 dBm. Under modulation, the measured bandwidth of the source is 24.7 GHz. This radiator array consumes 0.8 W DC power from a 1.2 V supply.

DESCRIPTION OF THE DRAWINGS

For a fuller understanding of the nature and objects of the disclosure, reference should be made to the following detailed description taken in conjunction with the accompanying drawings, in which:

FIG. 37 is a table showing a performance comparison of sub-millimeter-wave signal sources in CMOS.

DETAILED DESCRIPTION OF THE DISCLOSURE

Figure 1:
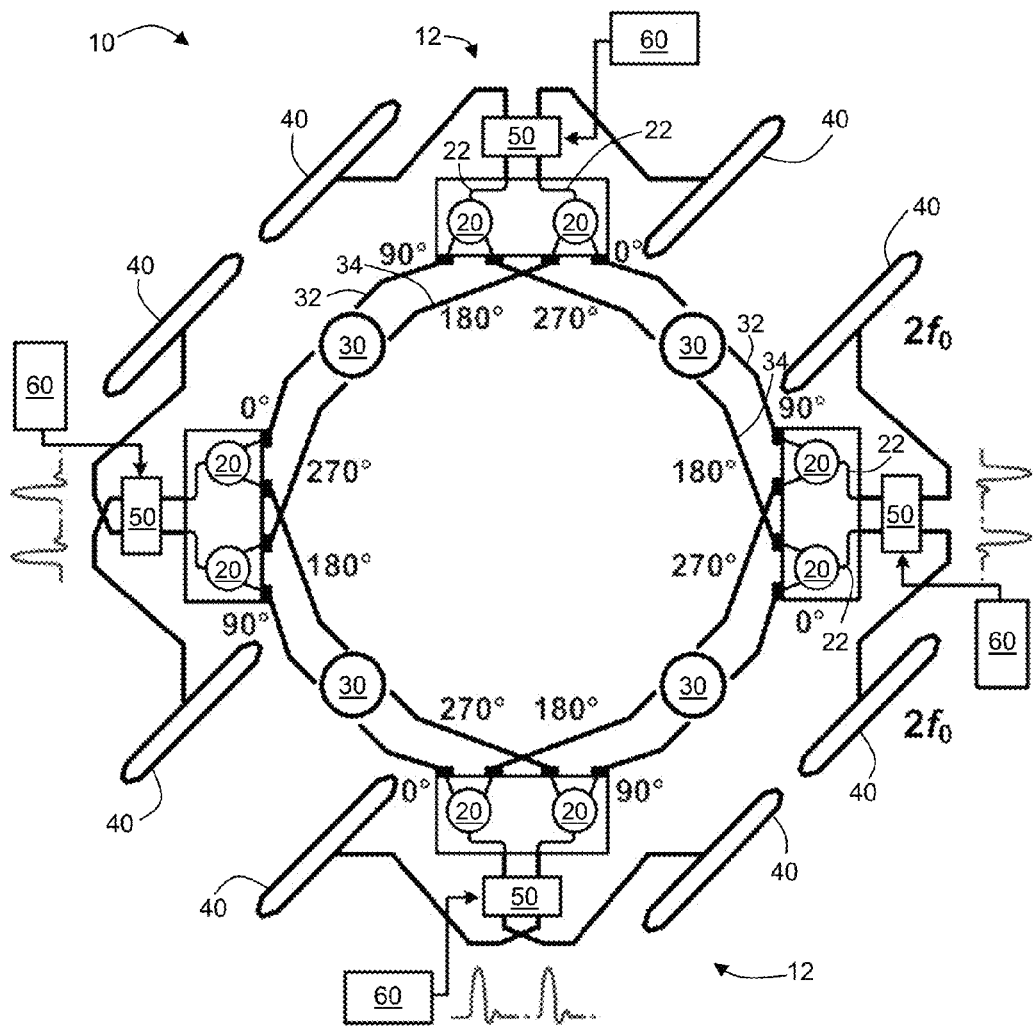
FIG. 1 is a diagram of a system according to an embodiment of the present disclosure.

In an aspect of the present disclosure, embodiments of a high-power, sub-millimeter-wave radiation source are provided. In some embodiments, a 65-nm bulk CMOS technology may be used. The architecture of an exemplary transmitter 10 is shown in FIG. 1, where four differential core oscillator 20 pairs (radiator units) are mutually coupled through four quadrature oscillators 30. In an embodiment, each core oscillator pair operates at 130 GHz and generates $2^{nd}$-harmonic signals at 260 GHz that are power-combined after radiating through eight on-chip antennas 40. Embodiments may include four shunt switches 50, controlled by narrow pulses (width≈45 ps), to modulate the radiation. The pulses can be generated by local digital circuit blocks 60 with programmable repetition rate up to 5 GHz. In this way, the broadband spectrum of the pulses is up-converted to the carrier frequency of 260 GHz. Without modulation, the chip 10 achieves a continuous-wave radiated power of 1.1 mW. Under modulation, the measured bandwidth of the source is 24.7 GHz, making it suitable for many Fourier Transform Infrared ("FTIR")-based THz spectrometers. In addition, if the switches 50 are modulated by digital data, this chip 10 can also be used as a transmitter for sub-millimeter/THz wireless communications.

The embodiment depicted in FIG. 1 shows that the two harmonic oscillators inside each radiator unit are coupled with 90° phase shift at $f_0$ through a quadrature oscillator. This way, the signal at $2f_0$ from each radiator unit is differential. Such coupling scheme facilitates the symmetrical placement of the on-chip antennas, and also enhances the switching capability as will be shown below. Through the in-phase radiation of the eight antennas, beam combining in free space is achieved, which enhances the total power and directivity of the radiation.

Figure 2:
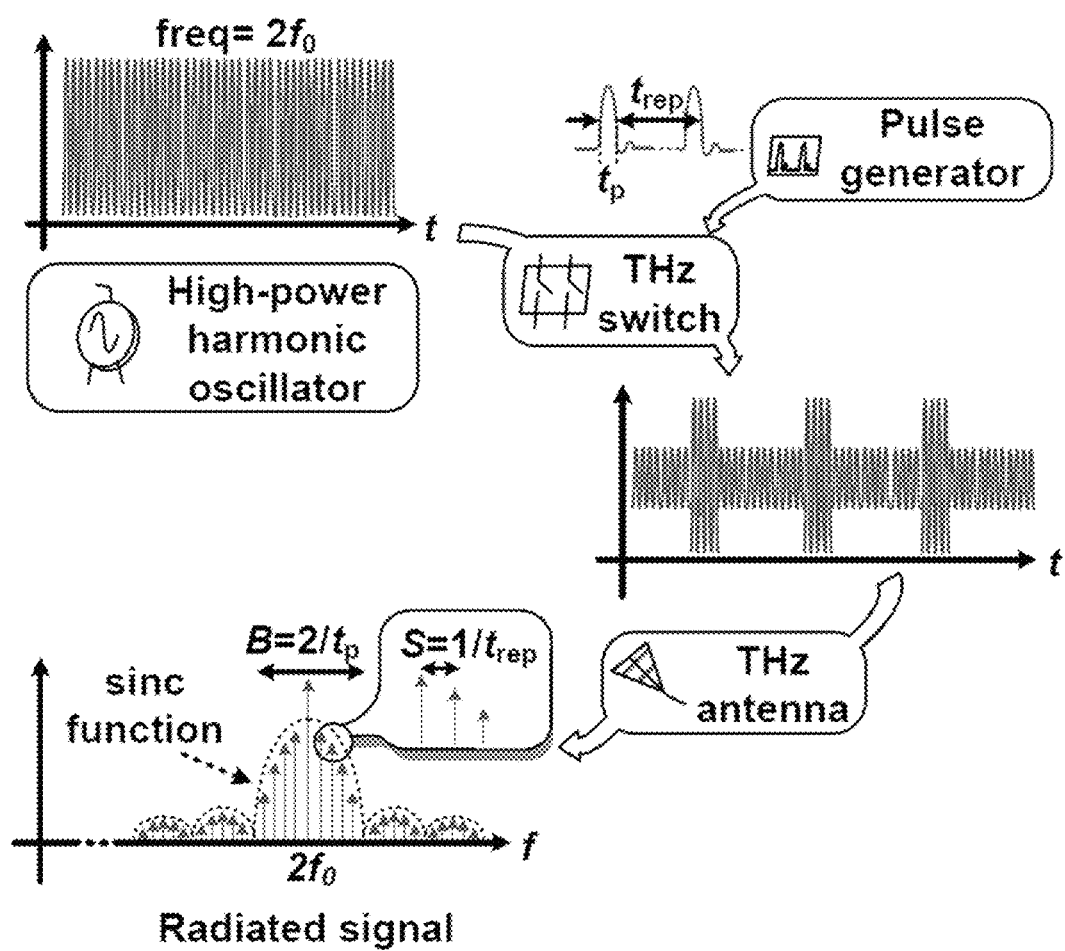
FIG. 2 is diagram showing the signals of the system of FIG. 1.

From the signal analysis in FIG. 1, it can be seen that since the harmonic oscillators only need to generate a single tone signal, power-bandwidth tradeoff can be avoided. This enables the use the presently disclosed self-feeding structure which is dedicated to generate high-power second-harmonic signal (further described below). In embodiments having pulse modulation, the output radiated signal is still centered around $2f_0$, but has an available bandwidth that is inversely proportional to the width of the controlling pulse (FIG. 2). Since pico-second pulse generation in CMOS has been demonstrated, such architecture has the potential to achieve a bandwidth near 100 GHz, which is sufficient to perform THz spectroscopy for some chemicals like methylchloride and sarin.

The ability to modulate the radiation makes the presently disclosed device suitable for other applications such as, for example, terahertz data transmission and tomography. It can also pair with the THz image sensors that do not have integrated Dicke switch, because the source radiation needs to be chopped at MHz frequencies to avoid the flicker noise of the sensors.

The present disclosure may be embodied as a system 10 for signal generation. In some embodiments, the system 10 includes four quadrature oscillators 30 and four radiator units 12 configured as a ring of alternating quadrature oscillators 30 and radiator units 12. Each quadrature oscillator 30 is configured to operate at a fundamental frequency. Each quadrature oscillator 30 has a 0° phase output, a 90° phase output, a 180° phase output, and a 270° phase output.

Each radiator unit 12 includes a pair of oscillators 20 operating at the fundamental frequency. A first oscillator 20 of the pair is connected to a neighboring two of the quadrature oscillators 30 at the 90° and 270° phase outputs, respectively. A second oscillator 20 of the pair is connected to the neighboring two quadrature oscillators 30 at the 180° and 0° phase outputs, respectively. The oscillators 20 of pair of oscillators are configured to generate differential signals at a second harmonic of the fundamental frequency.

Each radiator unit 12 further comprises two antennas 40. Each antenna 40 is in electrical communication with a corresponding oscillator 20 of the oscillator pair. A switch 50 is disposed between each oscillator 20 and the corresponding antenna 40 such that the oscillator 20 is selectively connected to the antenna 40 by way of the switch 50. Embodiments of the system 10 may comprise a pulse generator 60 operatively connected to the switch 50 for pulse modulation of the oscillator 20 signals. In other embodiments of the system, the switch 50 may be operated to modulate the oscillator 20 signals for data transmission or otherwise.

The present disclosure may be embodied as a method 100 for generating a broadband signal. A first phase signal and a second phase signal are generated 103 using a linking oscillator. For example, the linking oscillator may be a quadrature oscillator as is described above and further detailed below. The generated 103 first and second phase signals have the same fundamental frequency. The first phase signal has a phase which is different than the phase of the second phase signal.

The first phase signal may be provided 106 to a first harmonic oscillator to couple the first harmonic oscillator to the linking oscillator. The first harmonic oscillator generates a first output signal at a harmonic of the fundamental frequency. Similarly, the second phase signal may be provided 109 to a second harmonic oscillator to couple the second harmonic oscillator to the linking oscillator. The second harmonic oscillator generates a second output signal at a harmonic of the fundamental frequency, and the frequency of the harmonic of the second output signal is the same as the frequency of the harmonic of the first output signal (i.e., the same harmonic, regardless of phase).

The phase of the first phase signal and the phase of the second phase signal are selected such that the first and second output signals are differential signals. For example, where the first output signal and the second output signal are at the second harmonic of the fundamental, the first phase signal and the second phase signal differ by 90°.

The method may further comprise the step of pulse-modulating 112 the first and second output signals.

Further descriptions of exemplary components suitable for use in embodiments of the above-described system are provided below. In this disclosure, reference is made to a system operating at a fundamental frequency of 130 GHz for convenience, and should not be read so as to limit the disclosure.

Harmonic Oscillator

A. Fundamental Oscillation: Optimum Gain Condition

Figure 3:
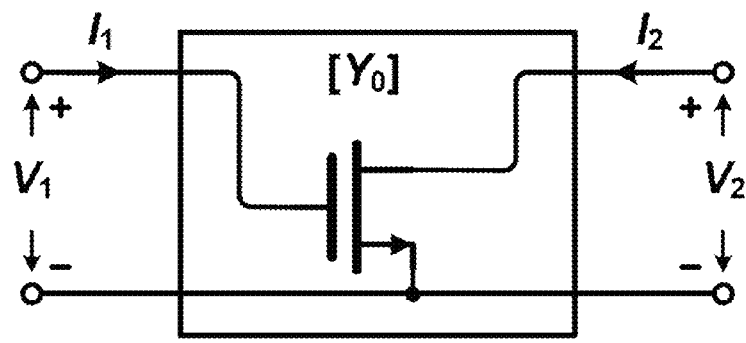
FIG. 3 is a diagram of a two-port network representation of a MOS transistor.

In harmonic oscillators, there is no external load to the fundamental ($f_0$) signal. In the steady state, all the fundamental power generated by the transistor (denoted as $P_{out}$) is delivered and dissipated in the peripheral passive network. The network is linear, so higher $P_{out}$ leads to higher voltage swing and higher nonlinearity. To maximize $P_{out}$, the analysis starts with transistor modeling. The traditional lumped model, which contains a transconductance cell and several parasitic components, is complicated for calculations of $P_{out}$. Therefore, to optimize $P_{out}$, a transistor was previously modeled as a two-port network with Y-parameters (FIG. 3):

$$[Y_o] = \begin{bmatrix} y_{11} & y_{12} \\ y_{21} & y_{22} \end{bmatrix}. \quad (1)$$

Accurate values of (1) can be directly obtained through S-parameter simulation of the foundry model or measurement of the test structures. In the present disclosure, (1) is obtained from the conversion of the simulated large-signal S-parameters, in order to more accurately capture the transistor behavior in oscillators. Another advantage of such modeling is that $P_{out}$ is readily expressed as a function of the root-mean-square voltages and currents of the gate ($V_1$, $I_1$) and the drain ($V_2$, $I_2$):

$$P_{out} = -Re(V_1 I_1^*) - Re(V_2 I_2^*). \quad (2)$$

Having obtained the Y-parameters of the transistor, the currents are expressed as:

$$\begin{cases} I_1 = y_{11} V_1 + y_{12} V_2 \\ I_2 = y_{21} V_1 + y_{22} V_2 \end{cases}. \quad (3)$$

Using (2), (3), and the defined gate-to-drain complex voltage gain $$A = \frac{V_2}{V_1}, \quad (4)$$

provides:

$$P_{out} = -g_{11}|V_1|^2 - g_{22}|V_2|^2 - |V_1||V_2|[(g_{12} + g_{21})\cos\angle A + (b_{21} - b_{12})\sin\angle A]. \quad (5)$$

In (5), $g_{ij}$ and $b_{ij}$ are the real (i.e., conductance) and imaginary (i.e., susceptance) parts of $y_{ij}$, respectively. To maximize the third term of (5), the optimum gain phase $\angle A_{opt}$ is:

$$\angle A_{opt} = \angle -(y_{21} + y_{12}^*). \quad (6)$$

Figures 4A, 4B:
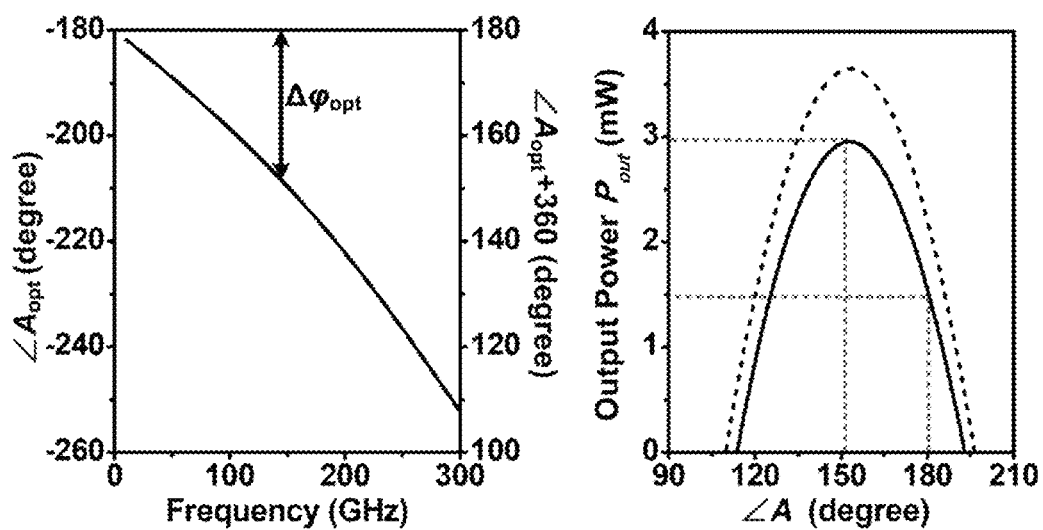
FIG. 4A is a graph of the simulated phase of the optimum gate-to-drain voltage gain of an NMOS (W/L=27 µm/60 nm) (the negative sign on the left y-axis represents the delay from the gate to the drain)
FIG. 4B is a graph of the simulated (solid line) and calculated (dashed line) $P_{out}$ of the transistor of FIG. 4A at 130 GHz versus varying gate-to-drain phase shift (the amplitudes of $V_1$ and $V_2$ are 1 V)
Figure 5A:
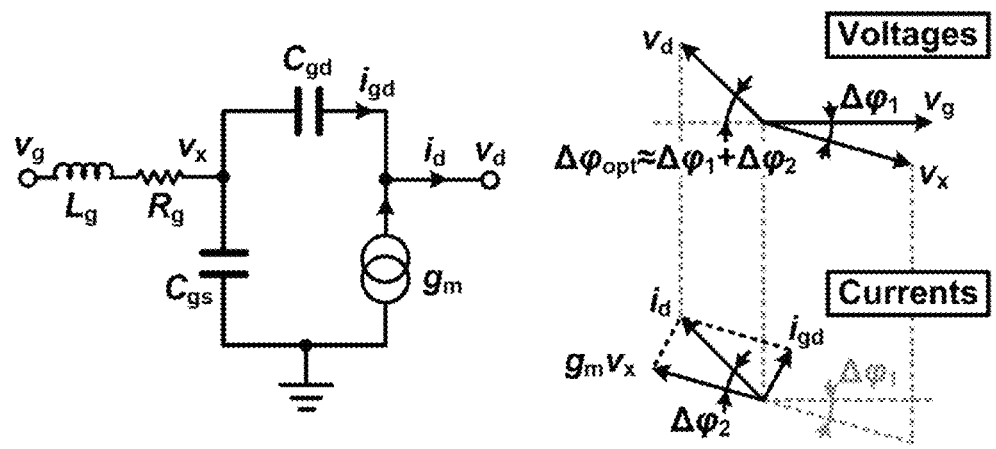
FIG. 5A are diagrams showing extra gate-to-drain voltage phase delay caused by gate parasitics and the feedforward current through $C_{gd}$.
Figure 5B:
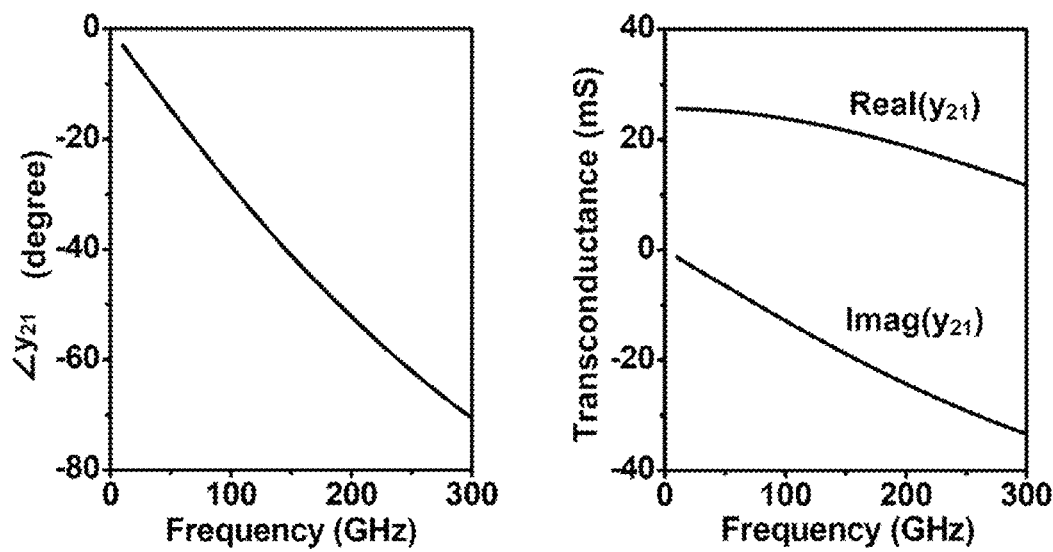
FIG. 5B is set of graphs of the simulated $\gamma_{21}$ of an NMOS (W/L=27 µ/60 n)

FIG. 4 shows the simulated optimum phase of an NMOS transistor (W/L=2 μm/60 nm) in a 65 nm CMOS process based on (6). When frequency increases, extra phase shift ($\Delta\phi_{opt}$) beyond −180° is required. As FIG. 4 shows, at 130 GHz the optimum phase of −210° (or 150°) provides a simulated output power $P_{out}$ twice as much as the 180° does. FIG. 5A intuitively explains this. First, a delay exists between the input gate voltage $v_g$ and the output drain current $i_d$. Such delay is caused by the parasitic R-L-C network of the gate (denoted by $\Delta\phi_1$) and by the feedforward current $i_{gd}$ through $C_{gd}$ (denoted by $\Delta\phi_2$). On the other hand, to maximize the output power of the drain node, the phase of the drain voltage $v_d$ should align with that of the drain current $i_d$; when $i_d$ is delayed with respect to the gate voltage $V_g$, the drain voltage $v_d$ should also be intentionally delayed. The relation between $V_g$ and $i_d$ is represented by the $y_{21}$ of the NMOS. And the simulated phase change of $y_{21}$ in FIG. 5B closely matches that of $A_{opt}$ in FIG. 4A, which validates such intuitive explanation. It is also noteworthy that the $\Delta\phi_{opt}$ in FIG. 4A is slightly affected by the large-signal gate/drain voltage amplitude. In the large-signal S-parameter simulation, $\Delta\phi_{opt}$ changes from 25° to 30° when the gate/drain voltage amplitude changes from 10 mV (small-signal) to 1 V (large-signal). This is because in FIG. 5A, the transconductance $g_m$ is smaller under large-signal excitation, resulting in larger $\Delta\phi_2$. Finally, we also use the Y-parameters extracted from the large-signal S-parameter simulation to calculate $P_{out}$ using (5). In FIG. 4B, the comparison with simulation result indicates that the disclosed method well predicts and optimizes $P_{out}$.

The amplitude of the optimum gain $|A_{opt}|$ can be derived by normalizing the outpower ($P_{out}/(|V_1||V_2|)$ or $P_{out}/|V_1|^2$). This however ignores the voltage limitation of the oscillation swing. For example, when $|A_{opt}|$ is greater than unity ($|V_1|<|V_2|$), then as the oscillation swing grows, the drain voltage saturates near $V_{DD}$ first, and the gate voltage only approaches $V_{DD}/|A_{opt}|$. Therefore, even if $P_{out}/|V_1|^2$ is maximized, $P_{out}$ is not necessarily the maximum that can be achieved. To correct this, a variable range $$\begin{cases} |V_1| \leq \frac{V_{DD}}{\sqrt{2}} \\ |V_2| \leq \frac{V_{DD}}{\sqrt{2}} \end{cases} \quad (7)$$

is applied to the optimization of $P_{out}$. The factor of $\sqrt{2}$ in (7) translates the root-mean-square (RMS) value to magnitude. In (5), the amplitude and phase of $A_{opt}$ are independent, so $\angle A_{opt}$ in (6) is still valid. Then it is substituted into (5) to get:

$$P_{out} = -g_{11}|V_1|^2 - g_{22}|V_2|^2 + |y_{12} + y_{21}^*| \cdot |V_1||V_2|. \quad (8)$$

Figure 6:
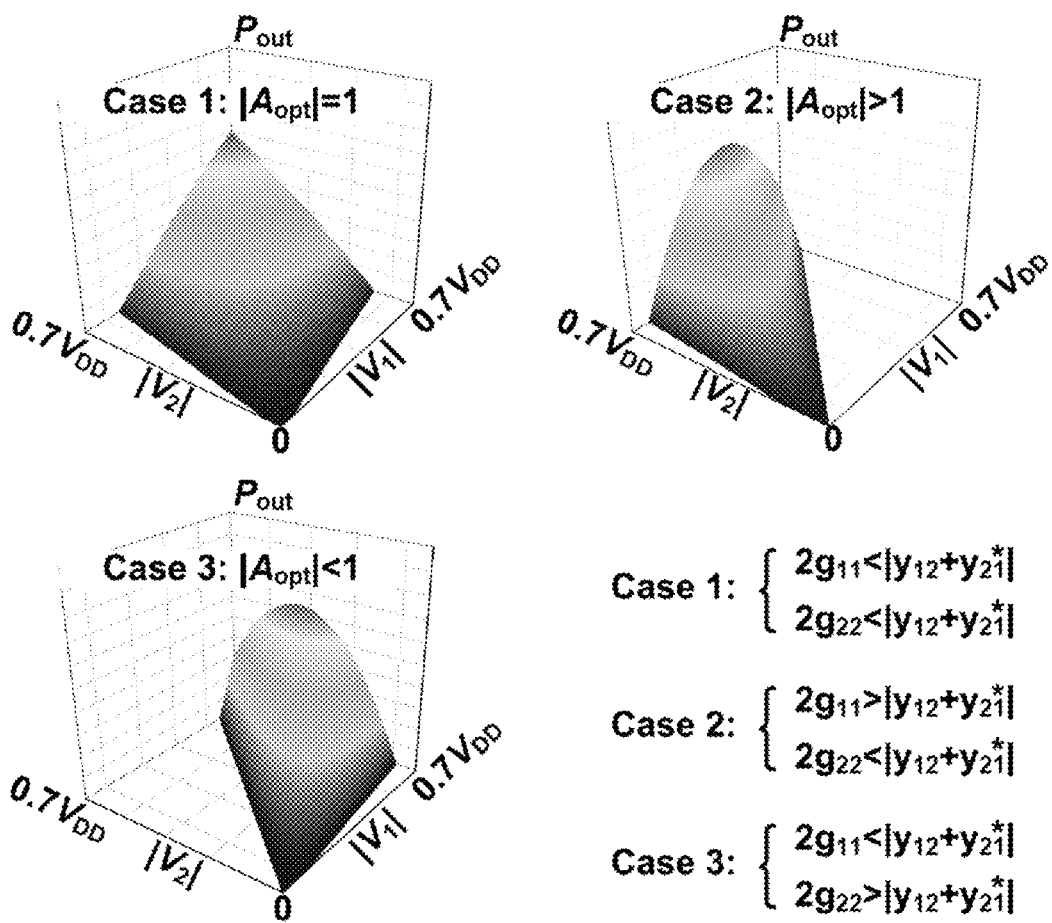
FIG. 6 is a set of graphs showing three possibilities for the parabolic curve of the output power in the voltage-limited oscillation.

At maximum $P_{out}$, at least one of $|V_1|$ and $|V_2|$ reaches $V_{DD}/\sqrt{2}$. Then, depending on the Y-parameters of the transistor, there are three possibilities for the parabolic curve of $P_{out}$ (shown in FIG. 6), which lead to different values of $|A_{opt}|$:

Case 1: $|A_{opt}| = 1$, if $\begin{cases} 2g_{11} < |y_{12} + y_{21}^*| \\ 2g_{22} < |y_{12} + y_{21}^*| \end{cases}$ (9)

Case 2: $|A_{opt}| = \dfrac{2g_{11}}{|y_{12} + y_{21}^*|} > 1$, if $\begin{cases} 2g_{11} > |y_{12} + y_{21}^*| \\ 2g_{22} < |y_{12} + y_{21}^*| \end{cases}$.

Case 3: $|A_{opt}| = \dfrac{|y_{12} + y_{21}^*|}{2g_{22}} < 1$, if $\begin{cases} 2g_{11} < |y_{12} + y_{21}^*| \\ 2g_{22} > |y_{12} + y_{21}^*| \end{cases}$ It is noteworthy that in (9), it is not possible to have both $2g_{11}$ and $2g_{22}$ larger than $|y_{12}+y_{21}^*|$. This is because the fundamental oscillation frequency is always below the cut-off frequency $f_{max}$, and the unilateral gain U is greater than unity, which is equivalent to the condition:

$$4g_{11}g_{22} < |y_{12}+y_{21}^*|^2. \tag{10}$$

Normally, the transistor transconductance $|y_{21}|$ is much larger than the device's input and output conductances ($g_{11}$ and $g_{22}$). Therefore, Case 1 in (9) gives the maximum $P_{out}$. Actually, the transistor of the 65-nm CMOS process used in exemplary embodiments of the present disclosure falls into this category, so $|A_{opt}|$ in such an oscillator is unity. This is, however, not always true. Case 2 and Case 3 may occur for two reasons: (1) the device loss ($g_{11}$ and $g_{22}$) increases as the frequency approaches $f_{max}$, and (2) the transconductance ($y_{21}$) decreases as the oscillation swing grows.

As indicated in FIG. 4B, the 180° phase shift in conventional push-push oscillators provides only half of the peak $P_{out}$. The power is even less in the real layout, because the metal line between the transistors' gate and drain causes the $\Delta\phi$ in FIG. 4A smaller than $\Delta\phi_{opt}$. An oscillator using a triple-push structure eliminates such problem. However, generation of the third harmonic is normally weaker than that of the second. Moreover, the output in the center of the triple-stage loop is hard to connect to the large-size on-chip antenna. Finally, the structure does not facilitate the symmetrical coupling in a power-combined oscillator array.

Figure 7:
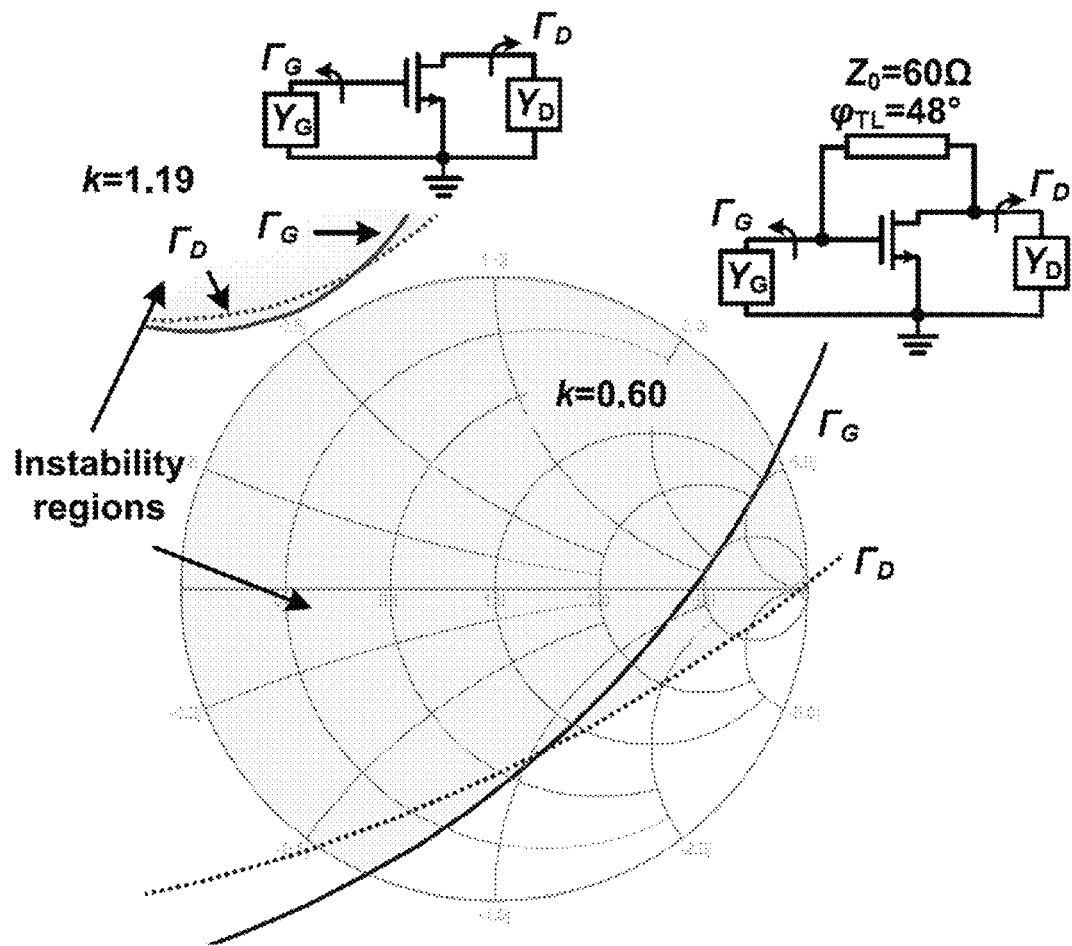
FIG. 7 shows the simulated stability of a transistor (W/L=27 µ/60 n) with and without a self-feeding line, where the stability factor of the network is k and the circles $\Gamma_G$ and $\Gamma_D$ are the stability boundaries of the terminations of the transistor gate $Y_G$ and drain $Y_D$, respectively (when the locations of $Y_G$ and $Y_D$ on the Smith Chart are inside of the instability regions, the circuits oscillate)

By observation, the transistor inside push-push or triple-push topologies needs another transistor(s) (i.e., active network) to form an oscillation loop. Having such active network around the transistor is advantageous, because the oscillation frequency is so high that the transistor becomes unconditionally stable. As FIG. 7 shows, at 130 GHz the stability factor k of the transistor is 1.19, and the simulated source/load instability regions, $\Gamma_G$ and $\Gamma_D$, are outside of the circle $|\Gamma|<1$. Therefore, any passive network at the gate and drain cannot cause oscillation. Nevertheless, if a self-feeding transmission line is inserted between the drain and the gate to intentionally degrade the inverse isolation of the transistor, the transistor becomes conditionally stable, as FIG. 7 shows. This means once the admittances of the passive terminations at the gate and drain ($Y_G$ and $Y_D$) lie inside the instability region, the transistor is able to oscillate by itself. Such concept leads to the exemplary self-feeding oscillator structure in FIG. 7, which contains a self-feeding line and two shunt components $Y_1$ and $Y_2$. Ideally, both $Y_1$ and $Y_2$ should be lossless, but such is not the case in reality. So, $Y_1$ is assumed to be lossless, essentially modeling all loss to $Y_2$.

The stability analysis only determines whether the oscillation can occur or not, not how strong it is. So next, a rigorous method is presented to give the values of the oscillator design parameters ($Z_0$, $\phi_{TL}$, $Y_1$, and $Y_2$), which precisely achieve the optimum gain conditions ($\angle A_{opt}$ and $|A_{opt}|$) derived above. It is noted that the electrical length $\phi_{TL}$ of the self-feeding line in FIG. 7 does not result in the same voltage phase shift $\angle A$, because in addition to the traveling wave, standing wave also exists inside the line.

First, the whole circuit is considered to be a two-port network with Y-parameter $[Y_{total}]$, which relates the external currents and voltages (FIG. 7):

$$\begin{bmatrix} I_{ext,1} \\ I_{ext,2} \end{bmatrix} = [Y_{total}] \cdot \begin{bmatrix} V_{ext,1} \\ V_{ext,2} \end{bmatrix}. \tag{11}$$

The entire network is composed of three sub two-port networks, $N_1$, $N_2$, and $N_3$. They share the same voltages, and their currents add up. Therefore, $[Y_{total}]$ is the sum of the parameters of the sub networks:

$$[Y_{total}] = [Y_0] + [Y_{TL}] + [Y_{shunt}], \tag{12}$$

where the transmission line network $[Y_{TL}]$ is:

$$[Y_{TL}] = j\begin{bmatrix} -\dfrac{1}{Z_0\tan\varphi_{TL}} & \dfrac{1}{Z_0\sin\varphi_{TL}} \\ \dfrac{1}{Z_0\sin\varphi_{TL}} & -\dfrac{1}{Z_0\tan\varphi_{TL}} \end{bmatrix} = j\begin{bmatrix} B_{T1} & B_{T2} \\ B_{T2} & B_{T1} \end{bmatrix}, \tag{13}$$

and the shunt components network $[Y_{shunt}]$ is:

$$[Y_{shunt}] = \begin{bmatrix} Y_1 & 0 \\ 0 & Y_2 \end{bmatrix} = \begin{bmatrix} G_1 + jB_1 & 0 \\ 0 & G_2 + jB_2 \end{bmatrix}. \tag{14}$$

Figure 8A:
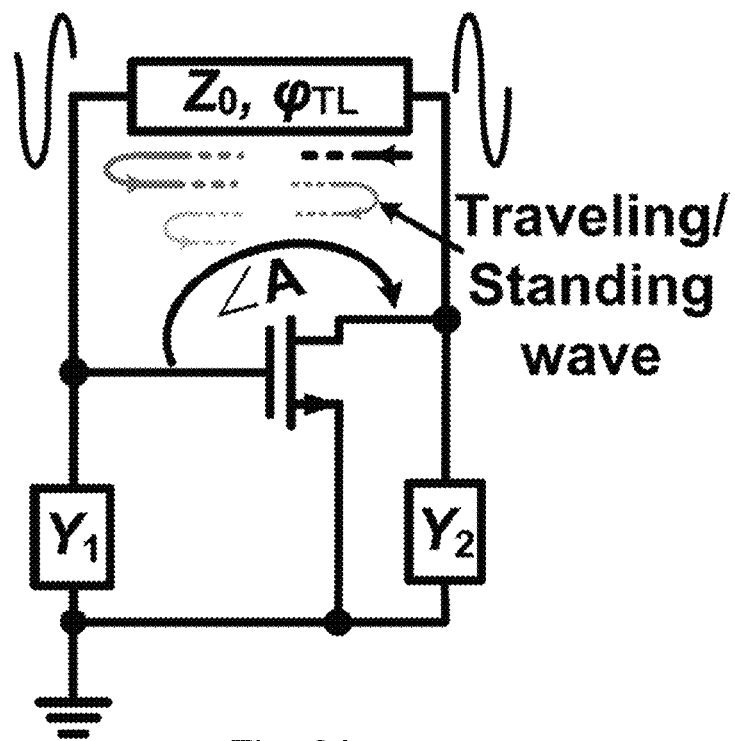
FIG. 8A is a diagram showing a self-feeding oscillator structure.
Figure 8B:
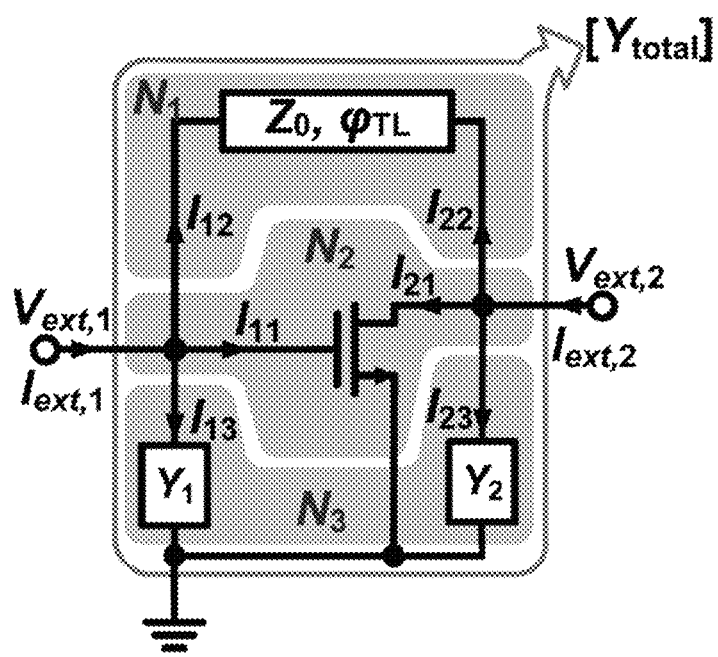
FIG. 8B is a diagram showing the two-port network analysis of the self-feeding structure, which is decomposed into three subnetworks $N_1$, $N_2$ and $N_3$.

Next, to solve for $[Y_{total}]$ that contains all circuit design parameters, two conditions are applied to the linear equations (11). First, the self-feeding structure in FIGS. 8A-8B is supposed to oscillate at fundamental frequency $f_0$. For an oscillator that is a self-sustaining network, the external currents $I_{ext,1}$ and $I_{ext,2}$ are zero. Therefore:

$$[Y_{total}] \cdot \begin{bmatrix} V_{ext,1} \\ V_{ext,2} \end{bmatrix} = \begin{bmatrix} I_1 \\ I_2 \end{bmatrix} = \begin{bmatrix} 0 \\ 0 \end{bmatrix}. \tag{15}$$

The second condition relates to the goal of achieving the optimum gain $A_{opt}$, which is, by definition, the ratio between $V_{ext,1}$ and $V_{ext,2}$. Therefore, (15) becomes:

$$[Y_{total}] \cdot \begin{bmatrix} 1 \\ A_R + jA_I \end{bmatrix} = \begin{bmatrix} 0 \\ 0 \end{bmatrix}, \tag{16}$$

where $A_R$ and $A_I$ are the real and imaginary parts of $A_{opt}$, respectively. Based on (16), then:

$$\begin{cases} y_{11} + Y_1 + jB_{T1} + (y_{12} + jB_{T2})(A_R + jA_I) = 0 \\ y_{21} + jB_{T2} + (y_{22} + Y_2 + jB_{T1})(A_R + jA_I) = 0 \end{cases}, \tag{17}$$

which can also be expressed in matrix form after separating the real and imaginary parts of each equation (shown in (18)).

$$\begin{bmatrix} 1 & 0 & 0 & 0 & 0 & -A_I \\ 0 & 0 & 1 & 0 & 1 & A_R \\ 0 & A_R & 0 & -A_I & -A_I & 0 \\ 0 & A_I & 0 & A_R & A_R & 1 \end{bmatrix} \cdot \begin{bmatrix} G_1 \\ G_2 \\ B_1 \\ B_2 \\ B_{T1} \\ B_{T2} \end{bmatrix} = \begin{bmatrix} -g_{11} - \mathrm{Re}(A \cdot y_{12}) \\ -B_{11} - \mathrm{Im}(A \cdot y_{12}) \\ -g_{21} - \mathrm{Re}(A \cdot y_{22}) \\ -b_{21} - \mathrm{Im}(A \cdot y_{22}) \end{bmatrix} \quad (18)$$

As assumed before, $Y_1$ is lossless, so $G_1$ is zero. Then the linear equations (18) are solved. In specific, for the transmission line design:

$$B_{T2} = \frac{1}{Z_0 \sin\varphi_{TL}} = \frac{g_{11} + \mathrm{Re}(A \cdot y_{12})}{A_I}. \quad (19)$$

Figure 9:
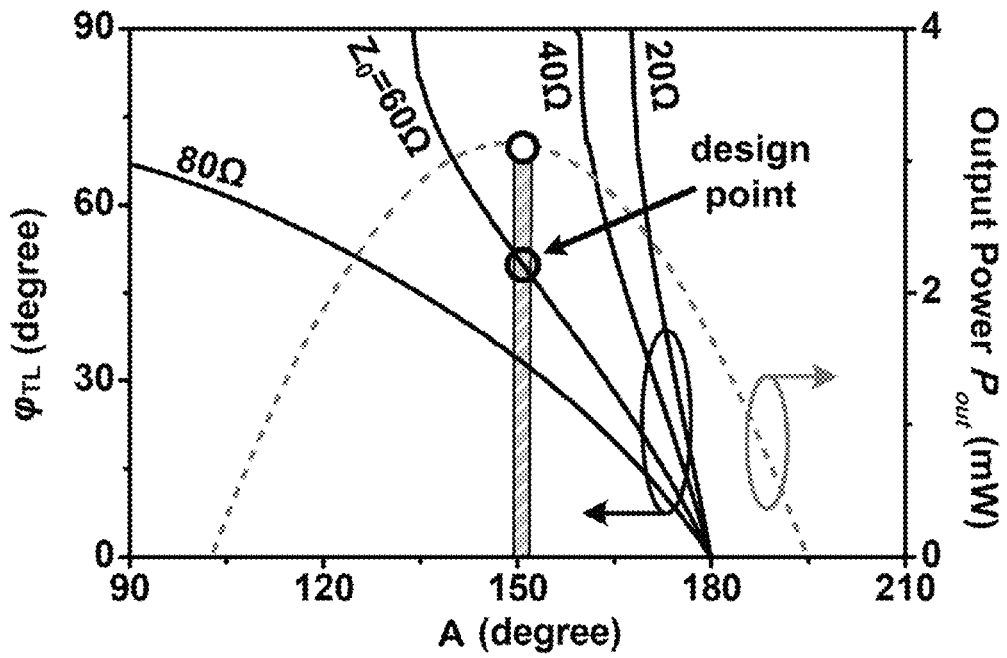
FIG. 9 is a graph showing the different combinations of $Z_0$ and $\phi_{TL}$ of a transmission line at 130 GHz to achieve the gain phase and the output power $P_{out}$.

In (19), the transmission line impedance $Z_0$ and electric length $\varphi_{TL}$ are coupled, and their relation is simulated in FIG. 9. As shown next, such flexibility is utilized to also optimize the harmonic generation efficiency. In the present example, $Z_0$ was chosen to be 60Ω and $\varphi_{TL}$ to be 48° at 130 GHz (~150 μm in physical length). The size of the transistor is 27 μm/60 nm, which is based on a comprehensive consideration of the output power, layout, and the feasibility of implementing the $Z_0$ of the self-feeding line associated with the transistor size.

B. Harmonic Generation and Efficiency Enhancement

Figure 10:
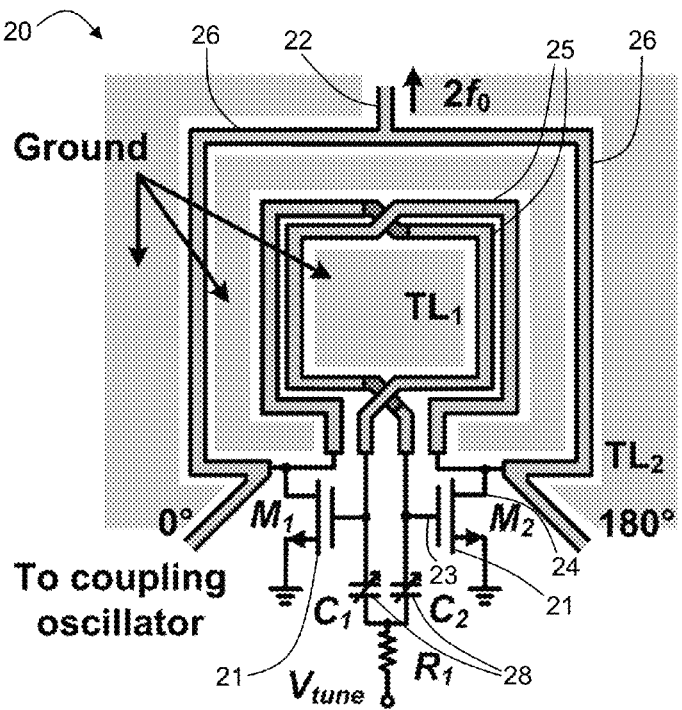
FIG. 10 is a diagram of a differential oscillator based on the self-feeding structure of an embodiment of the present disclosure.
Figure 11A:
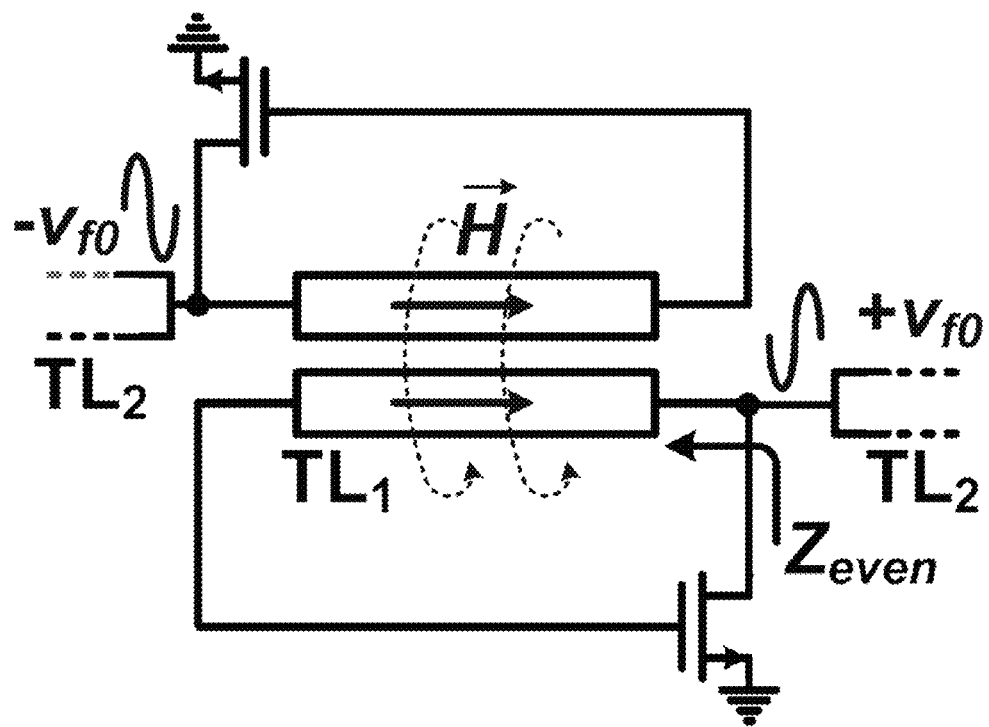
FIG. 11A is a diagram of the desired out-of-phase oscillation mode of the oscillator of FIG. 10.
Figure 11B:
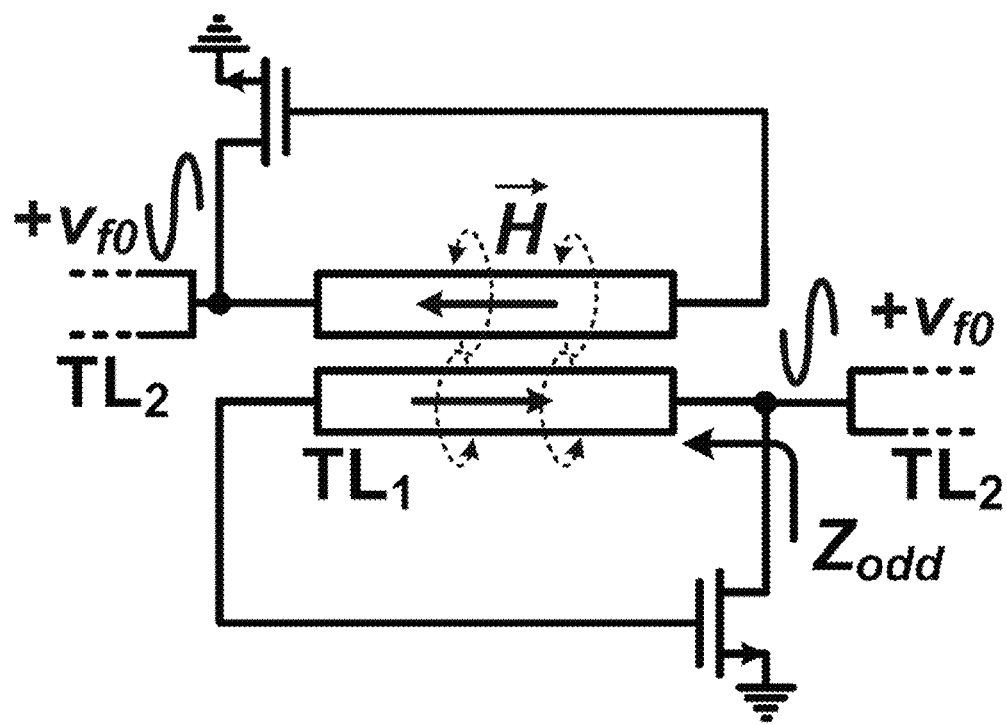
FIG. 11B is a diagram of the undesired in-phase oscillation mode of the oscillator of FIG. 10.

To extract the 2nd-harmonic signal out of the basic self-feeding structure described above, the schematic of an exemplary harmonic oscillator in the 260-GHz radiator array is shown in FIG. 10. Two self-feeding structures are coupled through their feedback transmission lines $TL_1$. Then two additional lines, $TL_2$, extract the 2nd-harmonic signals and combine them at the output. The output node is a virtual ground to the fundamental signal, thus reflects it back. This is because the two self-feeding structures are designed to have differential oscillation (discussed below). At $f_0$, the short-terminated lines $TL_2$ (78° in length) also provide the susceptance $B_2$ in (18). The susceptance $B_1$ of the gate shunt component is provided by a pair of thick-gate MOS varactors. Such varactors have a quality factor of 6~7 at 130 GHz (zero bias) and a dynamic cut-off frequency of 870 GHz. Besides, their capacitances are small (11 fF), so that in addition to the pulse modulation, this source can also continuously change frequency within a small range, without compromising the output power. With the RF-block resistor $R_1$ (6.6 kΩ), the varactors present high impedance to the common-mode signal at $2f_0$.

The above operation relies on the out-of-phase coupling mode of the two self-feeding structures. In this mode, the coupled lines $TL_1$ present the even-mode impedance $Z_{even}$ to each transistor. Therefore, to achieve the optimum gain $A_{opt}$, we set $Z_{even}$ to be 60Ω, and electrical length (at 130 GHz) to be 48°, which are derived in the previous section. However, by symmetry, the two self-feeding structures can also potentially oscillate with in-phase mode, which is undesired. In the present design, this mode is suppressed. This is because in this mode, the coupled lines present odd-mode impedance $Z_{odd}$ to each transistor, and $Z_{odd}$ was made to be only 20Ω, which gives a gain far from the optimum (thus smaller output power at $f_0$). Moreover, the quality factor of the coupled lines in this mode is lower, because the generated magnetic fields are partially canceled.

In an aspect of the present disclosure, a self-feeding oscillator 20 is provided. The oscillator 20 includes a coupled pair of transistors 21 configured to operate at a fundamental frequency $f_0$. A gate 23 of each transistor 21 is connected to a drain 24 of the transistor 21 by a feedback transmission line 25, and wherein the feedback transmission lines 25 are configured to couple the pair of transistors 21 in an out-of-phase coupling mode. An output node 22 is connected to the drain 24 of each transistor 21 by an output transmission line 26 tuned to a harmonic of the fundamental frequency. The output node 22 may be configured to suppress the fundamental frequency $f_0$. For example, the output node 22 may be configured to be a virtual ground at the fundamental frequency. The gate 23 of each transistor 21 may be capacitively coupled to a tuning input, for example, by a varactor 28.

Next, the efficiency of harmonic generation inside a harmonic oscillator is discussed. When a transistor is driven by a large voltage swing at the gate, its channel current is distorted, thus harmonic currents are generated. This is the fundamental mechanism utilized by almost all harmonic oscillators. The magnitude of the harmonic current is mainly determined by the distortion of the current at $f_0$, which is a function of the fundamental oscillation power $P_{out}$ and the transistor nonlinear I-V relationship $i_d(v_{g,2f_0}, v_{d,2f_0})$. (The effect of $v_{g,2f_0}$ on $i_d$ is represented by the $g_m$ at $2f_0$, and the effect of $v_{d,2f_0}$ is represented by the $g_{ds}$ at $2f_0$. Therefore, these two effects are not included in $i_{2f_0}$). Since $P_{out}$ has been maximized in above and $i_d(v_{g,f_0}, v_{d,f_0})$ is a property of the device itself, the current distortion, namely the harmonic channel current, is modeled as an independent current source at $2f_0$ (denoted as $i_{2f_0}$ in FIG. 12A). Then, at $2f_0$, the transistor is considered as a power source, and the amount of available power at the output load is:

$$P_{out,2f_0} = \frac{i_{2f_0}^2}{4G_{out}}, \quad (20)$$

where $G_{out}$ is the real part (i.e., conductance) of the total internal admittance in shunt with $i_{2f_0}$. For harmonic oscillators, it is important to have smaller $G_{out}$ to get higher $P_{out,2f_0}$.

Figure 12A:
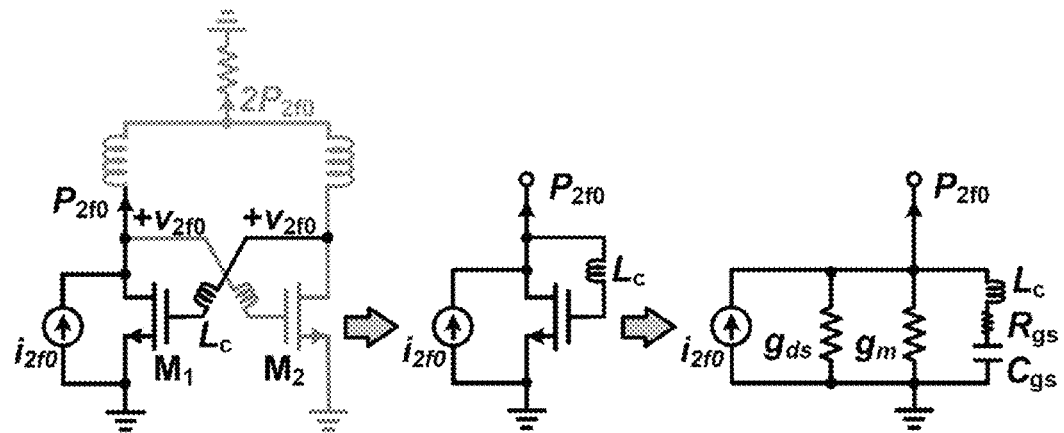
FIG. 12A is a diagram of the equivalent circuit of an NMOS modeled a power source at $2f_0$ in an push-push oscillator.

For the transistor inside a push-push oscillator, the 2nd-harmonic signals at the gate and drain nodes are equal in both magnitude and phase (FIG. 12A). The transistor is therefore diode-connected at $2f_0$. Unfortunately, for the transistor core (without parasitic capacitances), such configuration increases $G_{out}$ from $g_{ds}$ to $g_{ds}+g_m$. Essentially, this is due to the negative feedback path between the gate and drain. The simulated $g_{ds}$ and $g_m$ of the NMOS (W/L=27 μm/60 nm) used in the exemplary self-feeding oscillator are 3.2 mS and 24.7 mS, respectively. This means in push-push oscillators the available harmonic power of the NMOS core is reduced by a factor of 8.7. At the frequencies of interest, the parasitic capacitances are not negligible. As FIG. 12A shows, the direct gate-to-drain connection shorts the capacitor $C_{gd}$. However, $C_{gs}$, which is normally larger $C_{gd}$, is in shunt with $i_{2f_0}$. This further increases $G_{out}$ and decreases $P_{out,2f_0}$. Such degradation is even more significant with the presence of the inevitable interconnect from the drain of one transistor to the gate of another transistor (denoted as $L_c$ in FIG. 12A). The final $G_{out}$ of the circuit in FIG. 12A is plotted in FIG. 13, by simulating the total conductance of the diode-connected NMOS. In addition to $g_{ds}$ and $g_m$, the parasitics dominated by $C_{gs}$ increase $G_{out}$ to 35.4 mS at 260 GHz. With an $L_c$ of only 5 pH, the $G_{out}$ is further increased to 43.5 mS at 260 GHz.

Figure 12B:
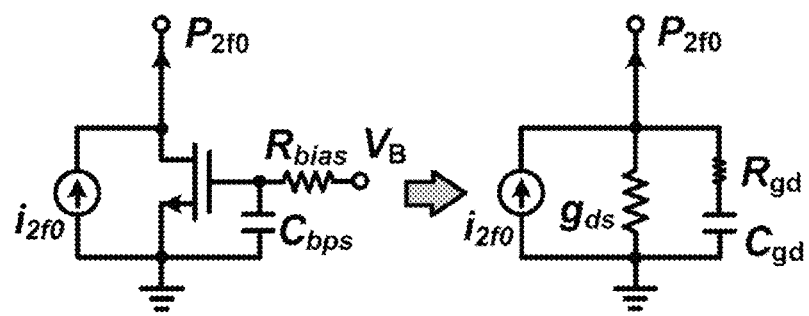
FIG. 12B is a diagram of an NMOS modeled a power source at $2f_0$ in an oscillator where the gate signal is zero.
Figure 13:
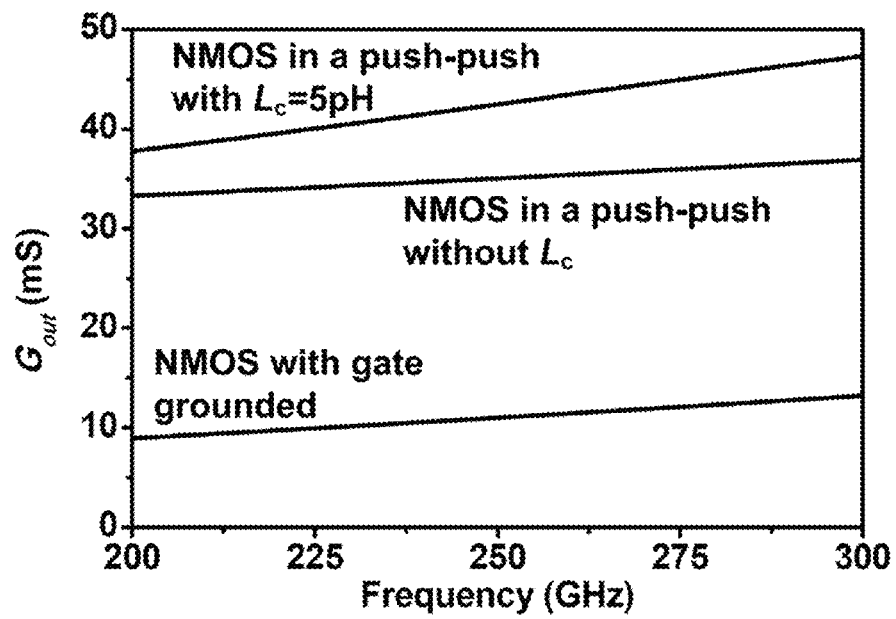
FIG. 13 is a graph showing the simulated $G_{out}$ of the NMOS inside a push-push oscillator, and the NMOS with its gate grounded.

The above analysis indicates that the reduction of the available harmonic power is mainly due to the presence of the 2nd-harmonic signal at the gate. As a comparison, in FIG. 12B, the gate signal is shorted to ground through a bypass capacitor $C_{bps}$. This way, the negative feedback path is eliminated, and the output conductance of the NMOS core becomes $h_{ds}$. At high frequency, $G_{out}$ is increased by $C_{gd}$, but since $C_{gd}$ is smaller than $C_{gs}$, such degradation is less than that in the push-push oscillator case. As FIG. 13 shows, the simulated $G_{out}$ of the NMOS in this case is 11.5 mS at 260 GHz. The available harmonic power $P_{out,2f_0}$ is therefore 3-4 times larger than that of the push-push oscillator.

Figure 14:
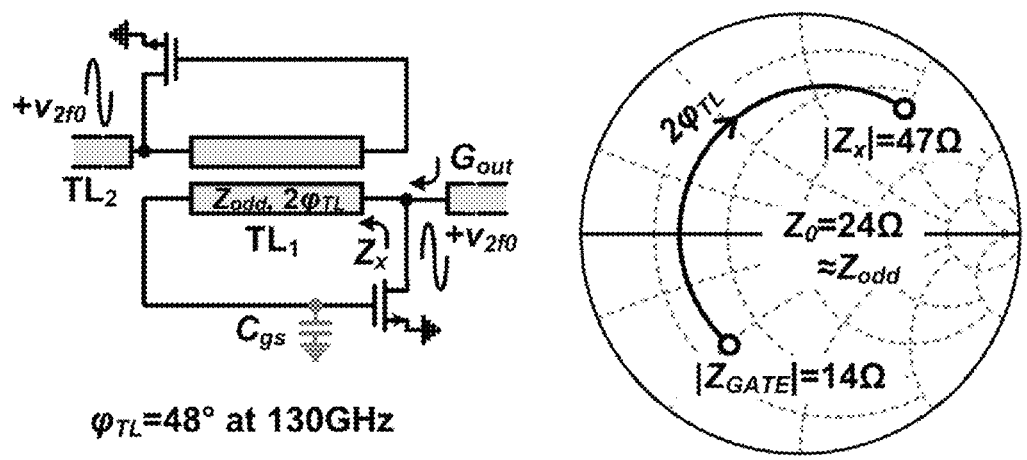
FIG. 14 is a diagram of and graph showing where the small, lossy impedance of the transistor gate is transformed into a much higher one at 260 GHz through the self-feeding transmission line.
Figure 15A:
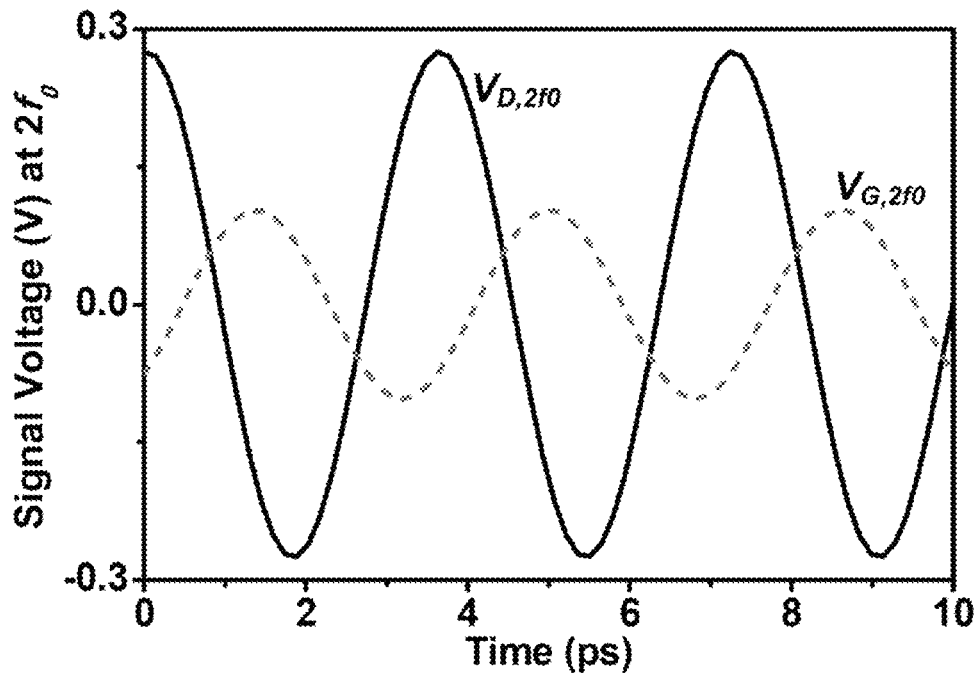
FIG. 15A is a graph showing the simulated 2nd-harmonic voltage waveforms at the gate and drain nodes of the self-feeding harmonic oscillator.
Figure 15B:
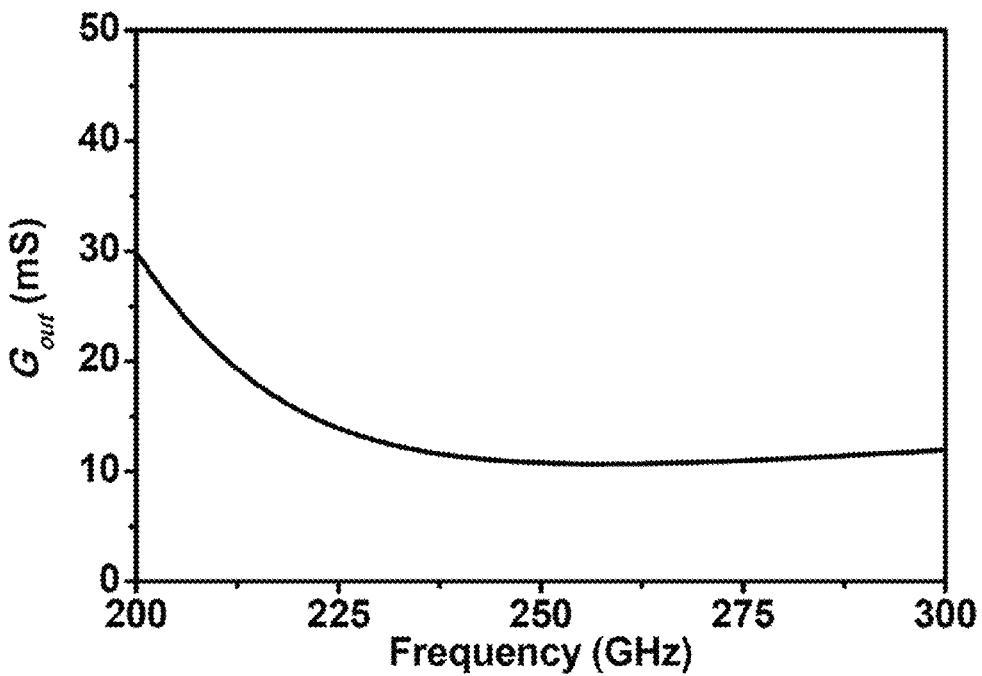
FIG. 15B is a graph showing the simulated output conductance, $G_{out}$ of the self-feeding harmonic oscillator.

Similar gate isolation is implemented by the self-feeding lines in the exemplary self-feeding harmonic oscillator. As FIG. 14 shows, the flexible choice of $\phi_{TL}$ in (2) and FIG. 9 is utilized. With the electrical length of 48° at $f_0$, the coupled lines are slightly over a quarter wavelength at $2f_0$. This quarter-wavelength line is in series with the transistor gate, and in simulation, the small impedance of the gate is increased by a factor of 3.5. Therefore, the $2f_0$ signal path from the drain to the gate is blocked. The waveforms in FIG. 15A are the 2nd-harmonic signals at the gate and drain from the harmonic-balance simulation of the self-feeding harmonic oscillator shown in FIG. 10. It can be seen that with the coupled-line-blocking, the signal level at the gate is 8.5 dB lower than that at the drain. The simulated output conductance, $G_{out}$, of one of the self-feeding structures (FIG. 14) is plotted in FIG. 15B. The loss of the transmission lines is included. At 260 GHz, $G_{out}$ is only 10.7 mS, which is even slightly lower than that of the gate-grounded NMOS in FIG. 13. This is because the $V_{G,2f_0}$ and $V_{D,2f_0}$ in FIG. 15A are nearly out-of-phase, which create a negative conductance through $g_m$ in the NMOS core and partially cancels the loss. Lastly, it is also noteworthy that without the shunt gate capacitance, the drain is better impedance-matched to the extraction line $TL_2$ in FIG. 10. So the signal at $2f_0$ inside $TL_2$ is mainly traveling wave, which reduces the signal loss caused by multi-reflection.

From above analysis, in comparison to conventional push-push oscillator, the exemplary self-feeding harmonic oscillator increases the fundamental oscillation power by a factor 2, and increases the output conductance of the current source at $2f_0$ by a factor of 4. The simulated output power of a single self-feeding harmonic oscillator is 0.82 mW. When the antenna feed line and output matching stubs are included, the output power is 0.6 mW. The simulated DC power consumption of one harmonic oscillator is 49 mW from a 1.2 V supply.

Quadrature Oscillator

Figure 16:
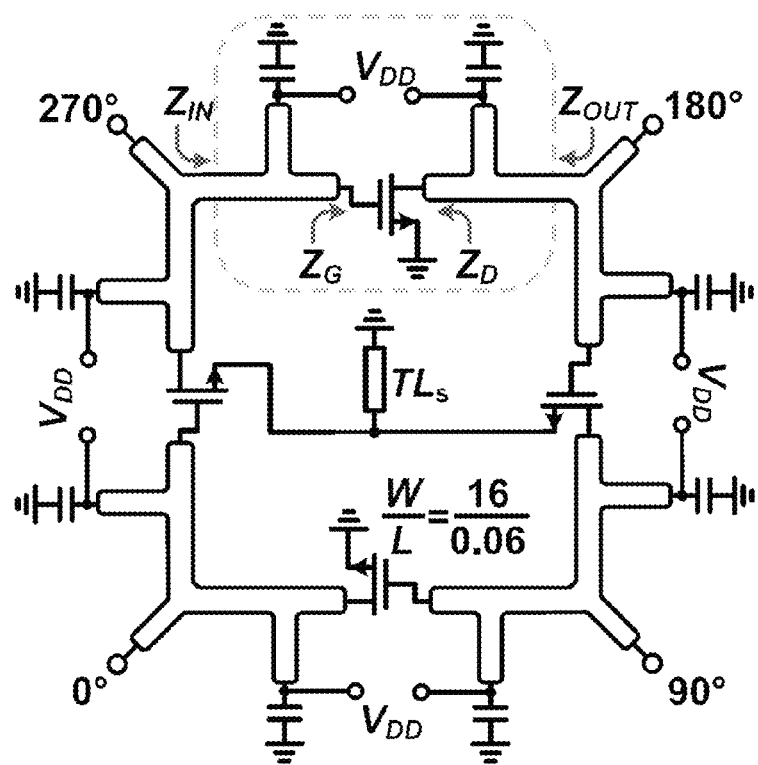
FIG. 16 is a schematic of a quadrature oscillator according to an embodiment of the present disclosure.
Figure 17:
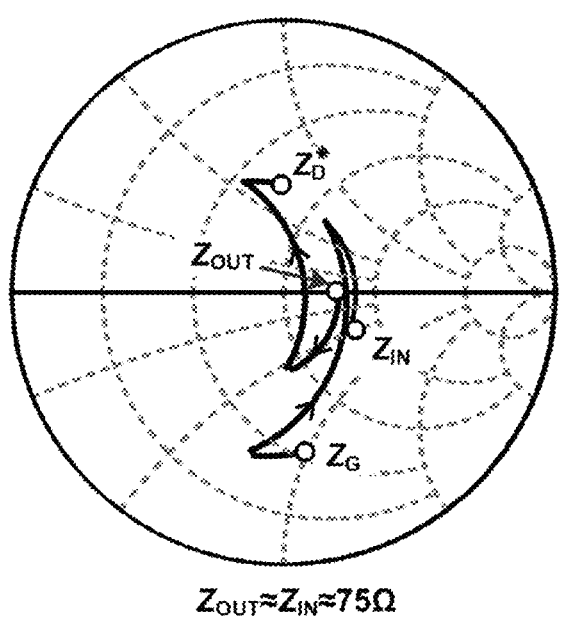
FIG. 17 is a chart of the simultaneous conjugate matching of an amplifier stage.

As is shown in FIG. 1, the differential self-feeding oscillators are inter-coupled through quadrature oscillators. The schematic of an embodiment of a quadrature oscillator is shown in FIG. 16. The quadrature oscillator comprises four single-transistor amplifier stages connected end-to-end. At the fundamental oscillation frequency (~130 GHz), the transistor is unconditionally stable (k=1.14). Therefore, for each amplifier stage, the input and output transmission-line networks are designed to achieve simultaneous conjugate matching (FIG. 17). This way, each amplifier not only has the maximum available gain $G_{max}$, but also has a phase shift that is easily adjusted to −270° by changing the lines between the stages. The simulated $S_{21}$ of each stage (including the loss of lines) in FIG. 18 (Mode 1) has a magnitude of 2.1 dB at 137 GHz, where the phase shift is −270°. Therefore, the loop oscillates near this frequency with the desired quadrature phase.

Figure 18:
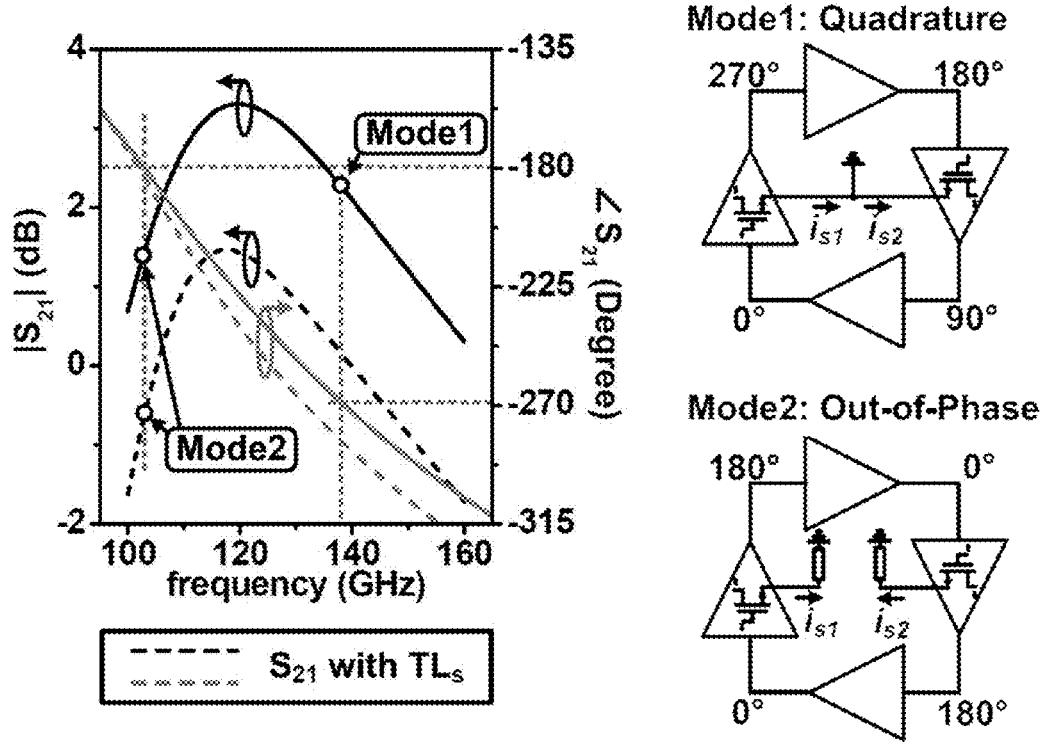
FIG. 18 shows the simulated stage gain of the quadrature oscillator in the desired quadrature mode (Mode1) and undesired out-of-phase mode (Mode2)

Unfortunately, the loop can also potentially oscillate in another mode with undesired phase. As is shown in FIG. 18, at a lower frequency near 100 GHz (Mode 2), the stage phase shift is −180°, and the gain is also larger than one. To address this issue, in FIG. 16 the source nodes of MOSFETs in the two opposite sides are combined, and a transmission line $TL_s$ (φ=30° at 130 GHz) is inserted between the combined node and the ground. In the desired quadrature oscillation mode, the currents in those two source nodes are out of phase, and cancel once combined (FIG. 18). In this way, the line $TL_s$ does not change the operation described above. But in the undesired out-of-phase mode, the two currents are in-phase, and they flow into $TL_s$ after combined. The simulation results in FIG. 18 indicate that with such source degeneration, the stage gain in the undesired mode (Mode 2) is suppressed below 0 dB. This circuit modification therefore selects the correct mode. In simulation, the quadrature oscillator consumed 76 mW DC power.

Sub-Millimeter-Wave Switch and Pulse Modulation

Figure 19:
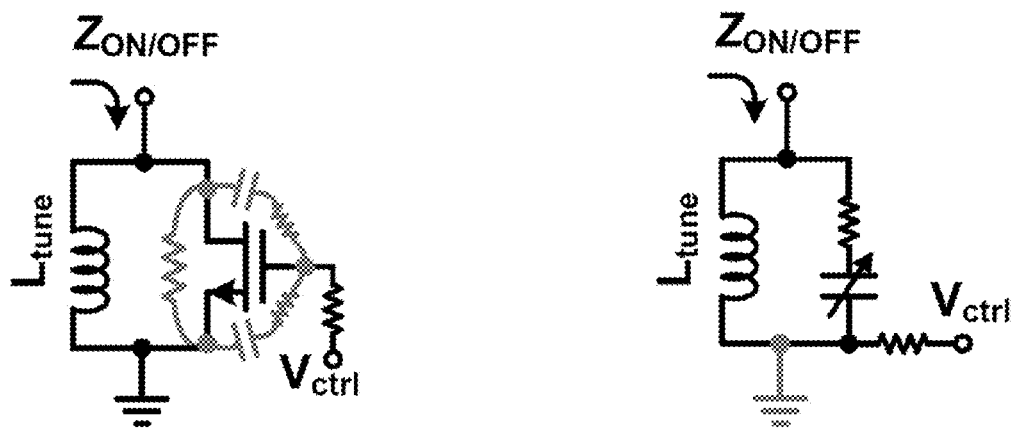
FIG. 19 are diagrams showing shunt switches based on MOSFET and MOS varactor, with the imaginary parts tuned out by an ideal inductor.
Figure 20:
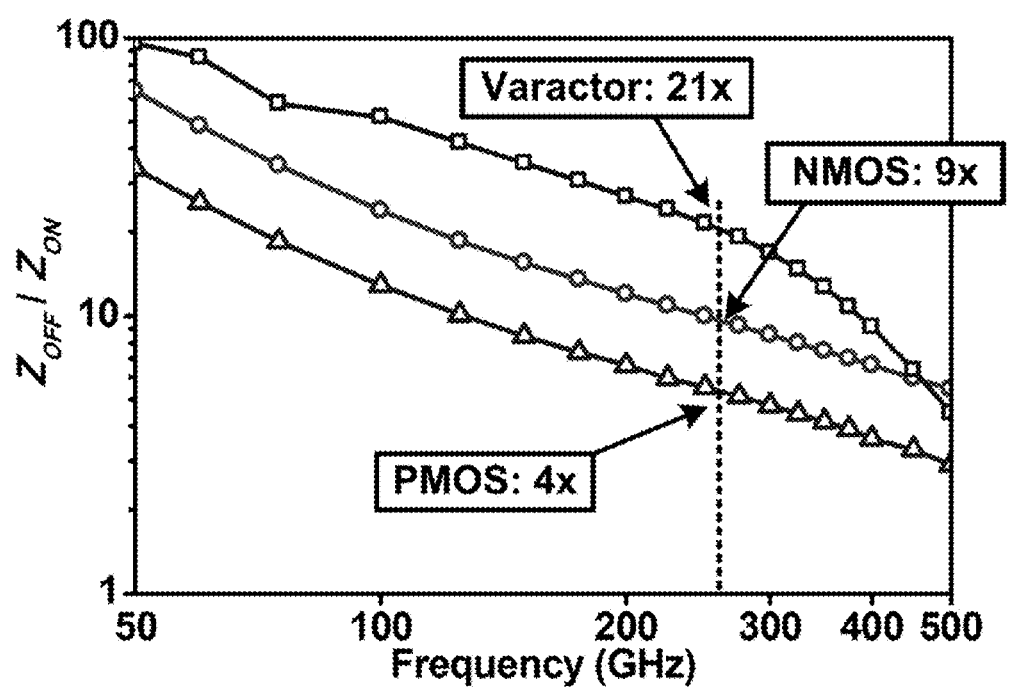
FIG. 20 is a graph of the simulated OFF and ON impedance ratios of PMOS, NMOS, and MOS varactor.

Normally, MOS transistors are used for switching. However, for frequencies in millimeter-wave and terahertz range, the parasitic capacitors of the transistor significantly leaks the signal when the channel is pinched off. Note that even if the capacitance is tuned out by a shunt inductor, such leakage path still exists, because the quality factor of the parasitic capacitors in such high frequency is low. To evaluate the switching capability of the device, the impedance ratio of the device in OFF and ON status is simulated, after the impedance imaginary part is tuned out by an lossless inductor (FIG. 19). Obviously, high $Z_{OFF}/Z_{ON}$ is desired. But FIG. 20 indicates that such ratio for an NMOS decreases from 65× at 50 GHz to only 9× at 260 GHz. To make things worse, since the signal lines to be switched carry the power supply ($V_{DD}$), only PMOS (instead of NMOS) can be used. And the impedance ratio of PMOS (FIG. 20) is 4× at 260 GHz. Such low OFF/ON ratio leads to an inefficient switching which reduces the power and bandwidth of the pulse-modulated output.

On the other hand, the simulated $Z_{OFF}/Z_{ON}$ of an n-type MOS varactor in the same process is as high as 21× at 260 GHz. This is due to several reasons. First, the switching of MOS transistors relies on the resistive change of the channel, $\Delta R_{ch}$. To reduce $Z_{ON}$ ($\approx R_{ch,on}$), larger channel width is needed, which directly increases the lossy parasitic capacitance and reduces $Z_{OFF}$. In comparison, a varactor switch utilizes the capacitance change $C_{max}/C_{min}$ of the core (excluding the parasitics), which is not limited by the device size. The parasitic capacitance of varactor, therefore, is minimized. Second, at higher frequency, while the $Z_{ON}$ of MOS transistor ($\approx R_{ch,on}$) remains the same, the $Z_{ON}$ of varactor is smaller, which partially compensates the degradation of $Z_{OFF}/Z_{ON}$ due to the smaller $Z_{OFF}$ at higher frequency. (3) The silicon for current conduction in MOS varactors is in accumulation mode, while that in MOS transistors is in inversion mode, which has more loss. The nonlinearity and loss comparison of different devices is highly dependent on process and layout. The superior nonlinearity and loss performance of MOS varactor in the same process has also been demonstrated by another 480 GHz passive frequency doubler work. In the schematic shown in FIG. 21, a pair of MOS varactors modulates the differential signals, which are driven by two self-feeding oscillators inside a radiator unit. So the varactor bottom control node behaves as a virtual ground at $2f_0$. This way the large and lossy parasitics, including the n-well to p-substrate capacitor and the digital pulse generator output impedance, are invisible to the 260 GHz signal, hence the associated loss is eliminated. The tuning inductors in FIG. 19 are absorbed into the design of the output networks.

In another aspect, the present disclosure can be embodied as a switch 50 for gating a signal having a signal frequency. The switch 50 comprises a transmission line 52 on which the signal is transmitted. A control node 56 is selectively configured to behave as a virtual ground at the signal frequency. A varactor 54 couples the transmission line 52 to the control node 56.

Figure 21:
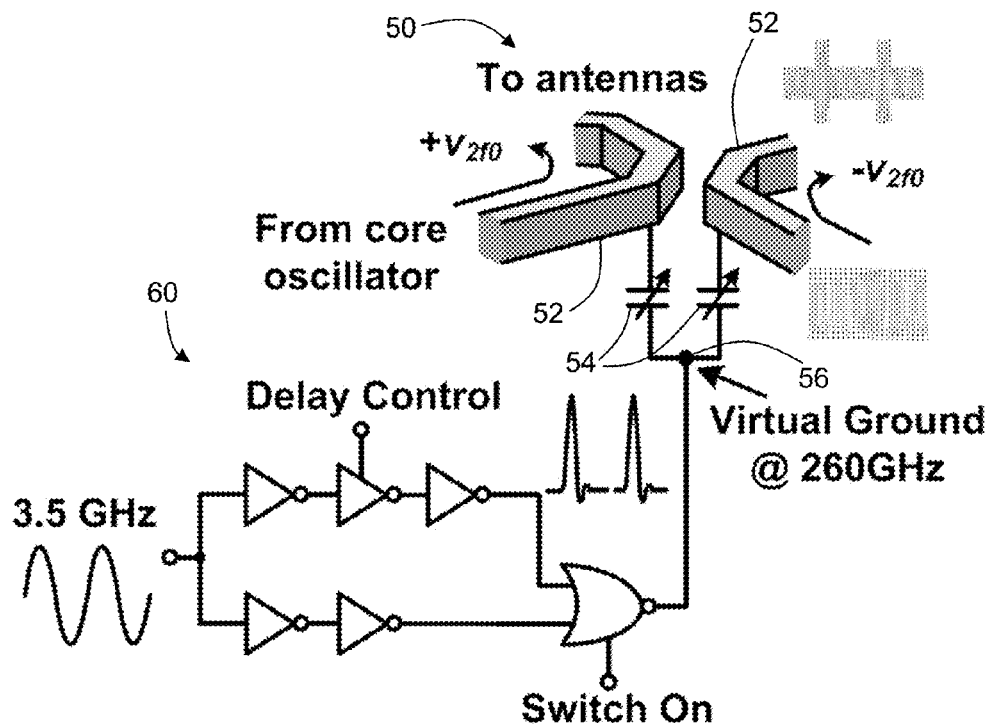
FIG. 21 is a schematic of a 260-GHz switch with pulse modulation according to an embodiment of the present disclosure.
Figure 22:
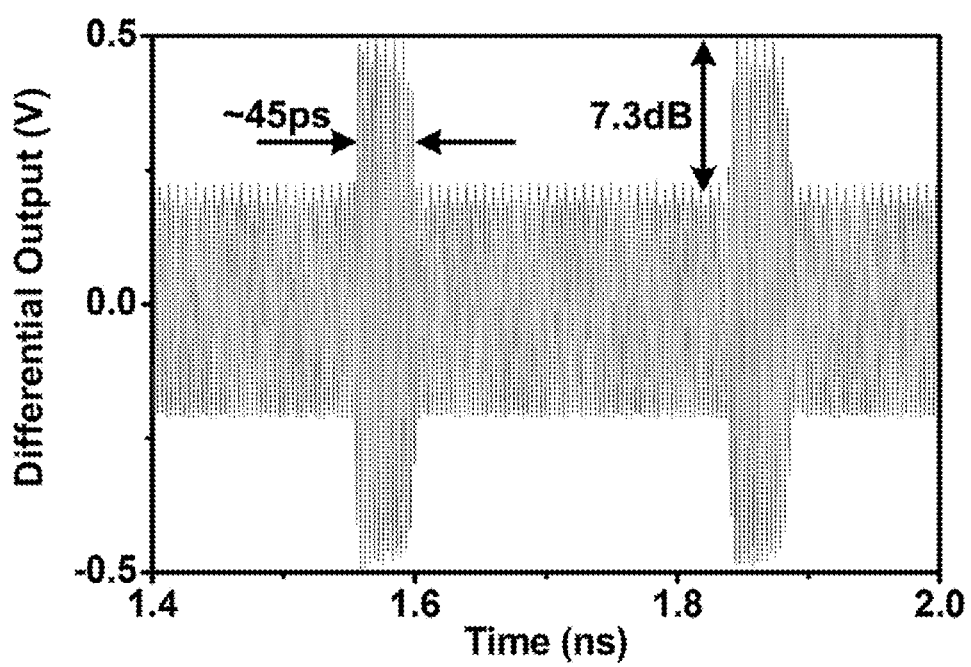
FIG. 22 is a simulated output waveform of a self-feeding oscillator pair with pulse modulation.

Near each switch, a local digital pulse generator 60 is placed to provide the control narrow-pulse train. Compared to the single central pulse generator scheme, the presently disclosed solution minimizes the dispersion caused by the long distribution network, which smoothes out the sharp pulses. The schematic of an exemplary pulse generator 60 is shown in FIG. 21. A multi-GHz signal feeds the inputs of a NOR gate through two inverter chains, with a small delay mismatch $\Delta t_{delay}$. The output of the NOR gate is therefore a sharp pulse with width close to $\Delta t_{delay}$. The transistors of the pulse generators are 2.5-V thick-gate I/O devices, which provide larger pulse amplitude to fully turn on/off the varactor switches. The simulated differential output waveform of one self-feeding oscillator pair, with pulse modulation, is shown in FIG. 22. The pulse width is 45 ps, and in the idle cycle, 80% of the radiation power is attenuated.

Slot Antenna and Radiation with a Silicon Lens

To radiate the high-power terahertz pulse, an on-chip antenna should have broad bandwidth and high radiation efficiency. However, there is normally a design tradeoff between these two merits. To avoid the lossy silicon substrate, some antennas like microstrip patch have a ground plane which reflects the radiation to the front side. But in a CMOS process, the radiator plate and ground plate are so close (<10 μm), that the resonance cavity they form has a very high quality factor. Therefore the impedance matching bandwidth is only around 5%. On the other hand, for antennas without a ground shield, bandwidth is greatly improved, but most of the wave is absorbed into the silicon and travels towards the back side. At the silicon-to-air interface on the back, the power reflection rate for an incident angle $\theta_i$ is:

$$R_{Si} = \left( \frac{n_1 \cos\theta_i - n_2 \sqrt{1 - n_{Si}^2 \sin^2\theta_i}}{n_1 \cos\theta_i + n_2 \sqrt{1 - n_{Si}^2 \sin^2\theta_i}} \right)^2, \quad (21)$$

where the refractive index of the silicon $n_{Si}$ is 3.45. The values of $n_1$ and $n_2$ are $n_{Si}$ and 1 for s-polarization, and 1 and $n_{Si}$ for p-polarization. Based on the calculated plots in FIG. 23, the total reflection critical angle is only 16° due to the large $n_{Si}$. The wave outside of such small "window" is reflected and trapped in the substrate. The radiation efficiency is therefore greatly reduced. To reduce the substrate wave and loss, previous works have thinned the wafer near 100 μm.

Figure 25:
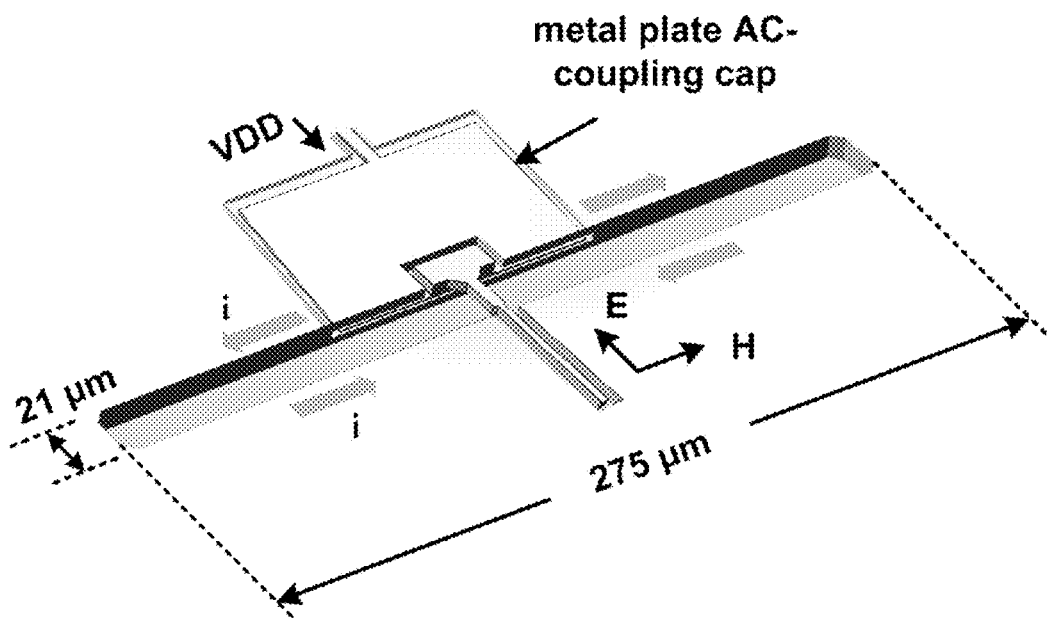
FIG. 25 is a diagram of a 260-GHz slot antenna.
Figure 26:
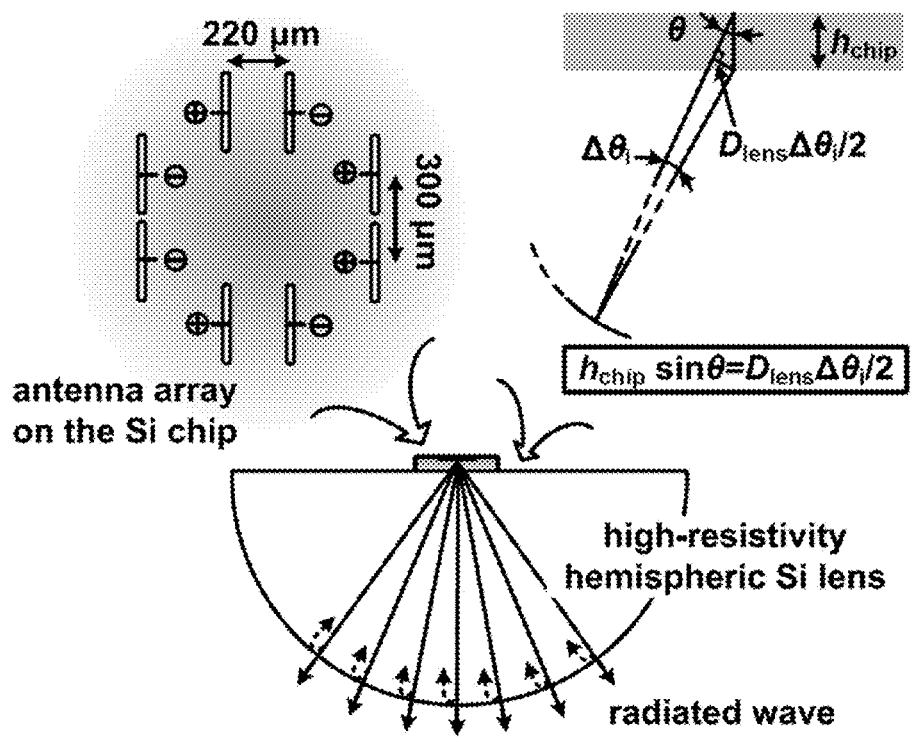
FIG. 26 is a diagram of an 8-element on-chip antenna array with a silicon lens attached on the chip back.
Figure 27A:
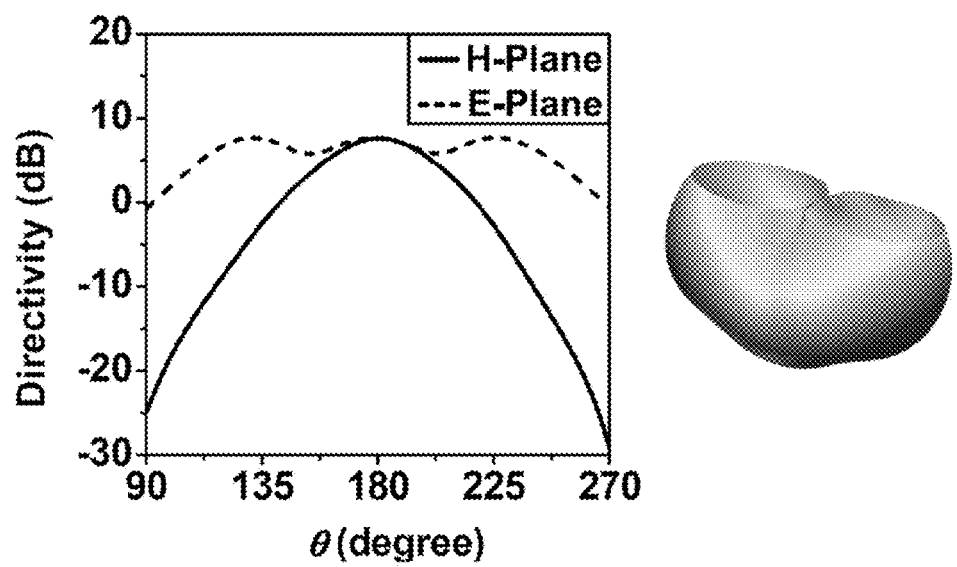
FIG. 27A shows the simulated radiation pattern of a slot antenna unit.
Figure 27B:
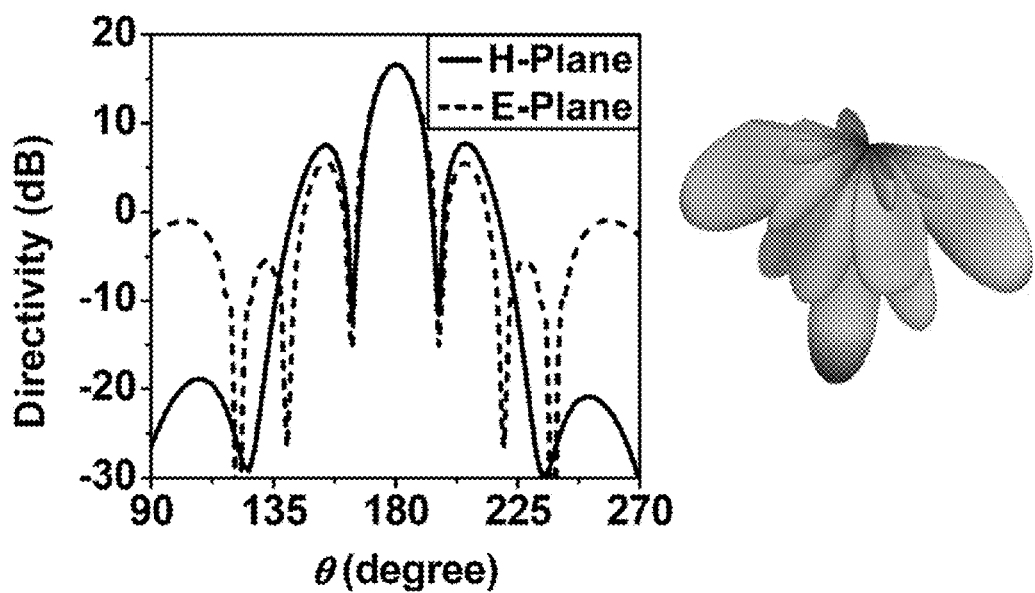
FIG. 27B shows the simulated radiation pattern of an 8-element slot antenna array.

In an embodiment of the present disclosure, an array of 8 slot antennas is used. Without having a ground reflector, the bandwidth for impedance matching ($|S_{11}|$–10 dB) is over 60 GHz. Compared to commonly-used dipole antennas, slot antennas better suppress undesired front side radiation, and a wide metal plane for current conduction reduces loss. Moreover, being a slot in a ground plane (FIG. 25), the antenna fits better into the chip layout for a compact, efficient feed-line network. Shorter distance between antenna elements is also advantageous to reduce the side lobes of the array combined beam. To handle the reflection issue, a high-resistivity silicon lens may be attached to the chip backside (FIG. 26). The lens is hemispheric, so that the incident wave in each direction is very close to normal to the lens surface, thus has the minimum reflection. In HFSS, the simulated directivity of one slot antenna element, including the 260 m-thick substrate (10 Ω·cm), is 7.6 dBi for the radiation into a hypothetical semi-infinite silicon space (FIG. 27A). The directivity is further enhanced by 9 dB in the 8-element array (FIG. 27B). The simulated radiation efficiency from the antenna array to the inside of the silicon lens is 60%. Even with 30% reflection at the lens surface (calculated in FIG. 23), the total radiation efficiency (antenna-to-air) is still as high as 42%. The diameter of the silicon lens $D_{lens}$ is 10 mm, which is 40× larger than the chip thickness $h_{chip}$. Therefore, the convergence to the array radiation beam in FIG. 27 by the lens is very small. According to the geometrical optics in FIG. 26, the convergence effect is more significant for large polar angle θ, or in another word, for antennas with less directivity. This is a difference between the previous works, which integrate silicon lens with single antenna element or an array of independent elements, and the present disclosure, where the array beam is much more concentrated in the vertical direction. Even at the edge of the main lobe (θ=13°), where the radiation intensity already drops to ~2% of the peak, the deviation of $\Delta\theta_i$ is only 0.7°.

Figure 23:
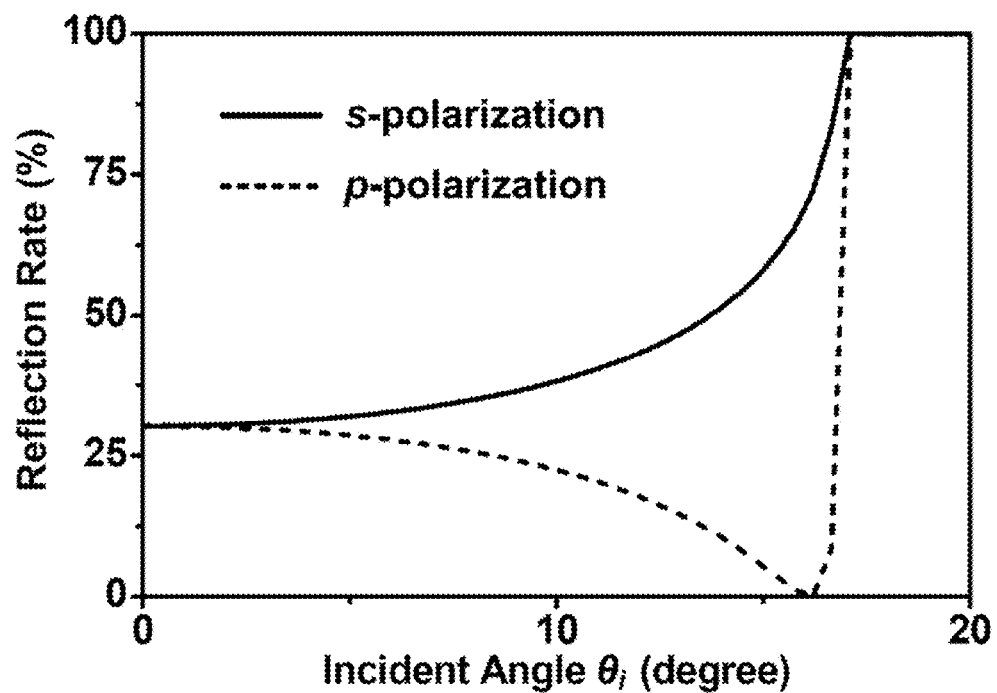
FIG. 23 is a graph of the calculated reflection rate at the silicon-to-air interface.
Figure 24:
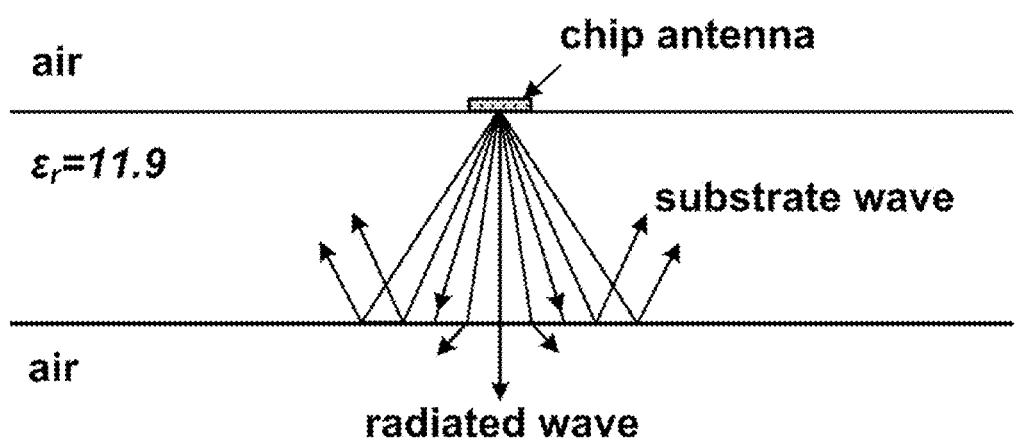
FIG. 24 is an illustration of the radiated and reflected waves from an on-chip antenna.

With a hyper-hemispheric lens, more directive radiation beam and higher EIRP (effective isotropic radiated power) are expected. However, since the wave radiated from the chip to the lens is not normal to the lens surface, the total radiated power is reduced by the higher reflection loss (FIG. 23). Meanwhile, the beam convergence by the hyper-hemispheric lens makes it difficult to compare the simulated pattern in FIG. 27 with measurements.

Exemplary Embodiment and Experimental Results

Figure 28:
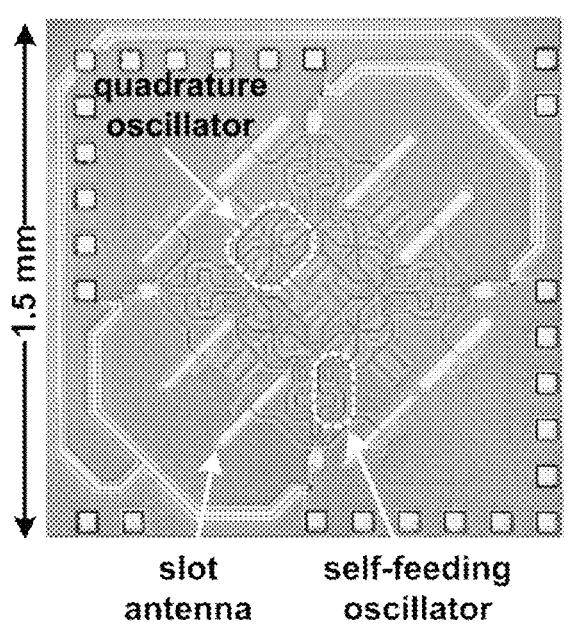
FIG. 28 is a micrograph of a 260-GHz radiator array in CMOS.
Figure 29:
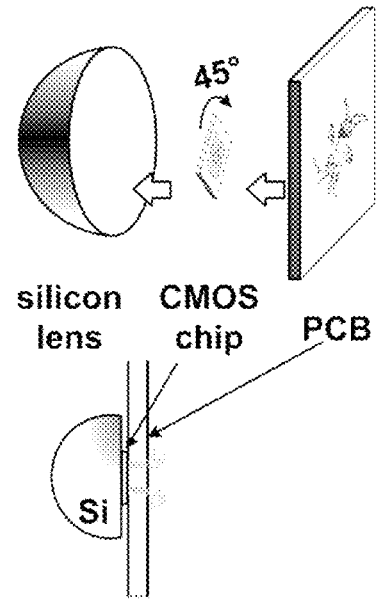
FIG. 29 shows integration of a silicon lens on a device according to the disclosure.
Figure 30:
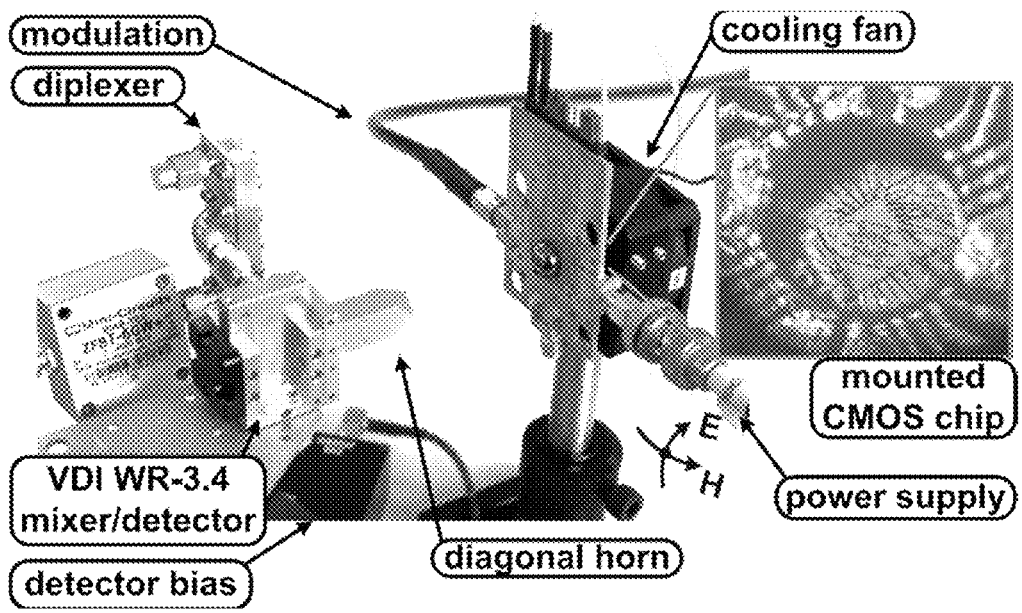
FIG. 30 is a photo of a chip package and testing setup with sub-harmonic mixer.

A 260-GHz radiator array was implemented using a 65-nm bulk CMOS technology. FIG. 28 shows the micrograph of the die, which has an area of 1.5×1.5 mm². FIG. 29 illustrates the packaging of the chip and the integration with the silicon lens. First, the edges of the chip front side were glued onto an FR-4 PCB, which has a hole to expose the chip pads. Then wires were bonded to connect the chip pads with the PCB pads. Since the EM field of the slot antennas was concentrated in the back side, the bond wires did not interfere with the circuit operation. As the die photo shows, the antennas were laid out in the diagonal direction of the chip; so to align the radiation E-field with that of the receiver antenna in the measurement, the chip was rotated by 45° when mounted on the PCB. Next, the silicon lens was pressed onto the chip backside by a 2-D micromanipulator. The alignment of the lens with respect to the chip was adjusted until the direction of the output radiation beam was vertical to the chip. Finally, the lens was glued with the PCB. The chip consumed 0.8-W power from a 1.2-V DC supply. The large DC current flows through only 40 RF transmission lines (W=2 μm) into the transistors, so prevention of overheating is advantageous so that the lines are not damaged. Unfortunately, since the two sides of the chip were occupied by bond wires and silicon lens respectively, it was not possible to mount a heat sink for thermal pathway. So a cooling fan was mounted to the front of the chip. A photo of the packaging is shown in FIG. 30.

Figure 31:
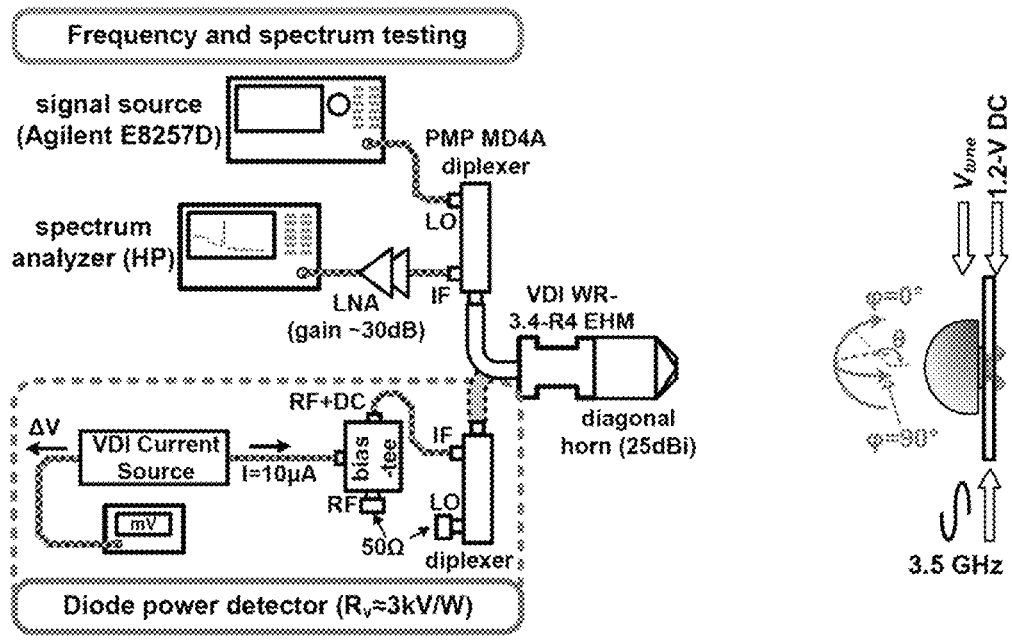
FIG. 31 is a block diagram of a testing setup for measuring the radiation frequency and spectrum of a 260-GHz radiator array.
Figure 32:
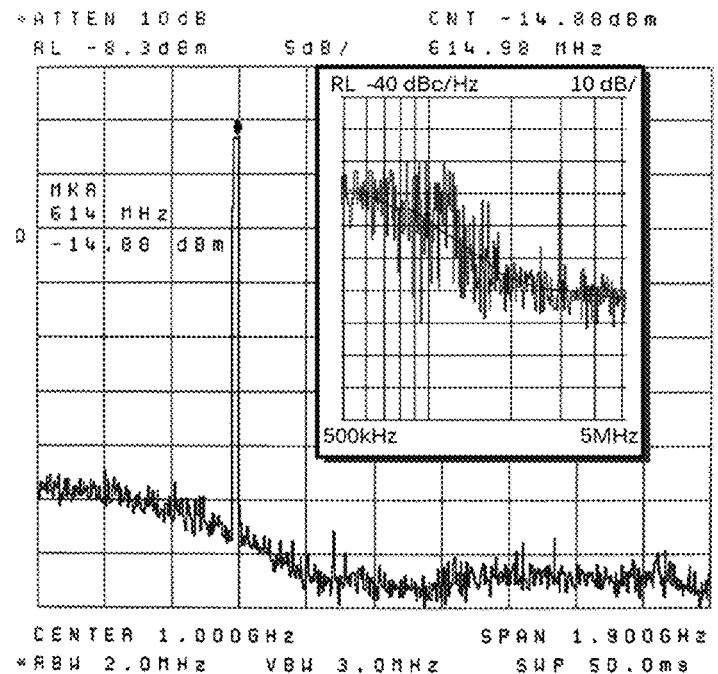
FIG. 32 shows the measured baseband spectrum from a sub-harmonic mixer.
Figure 33:
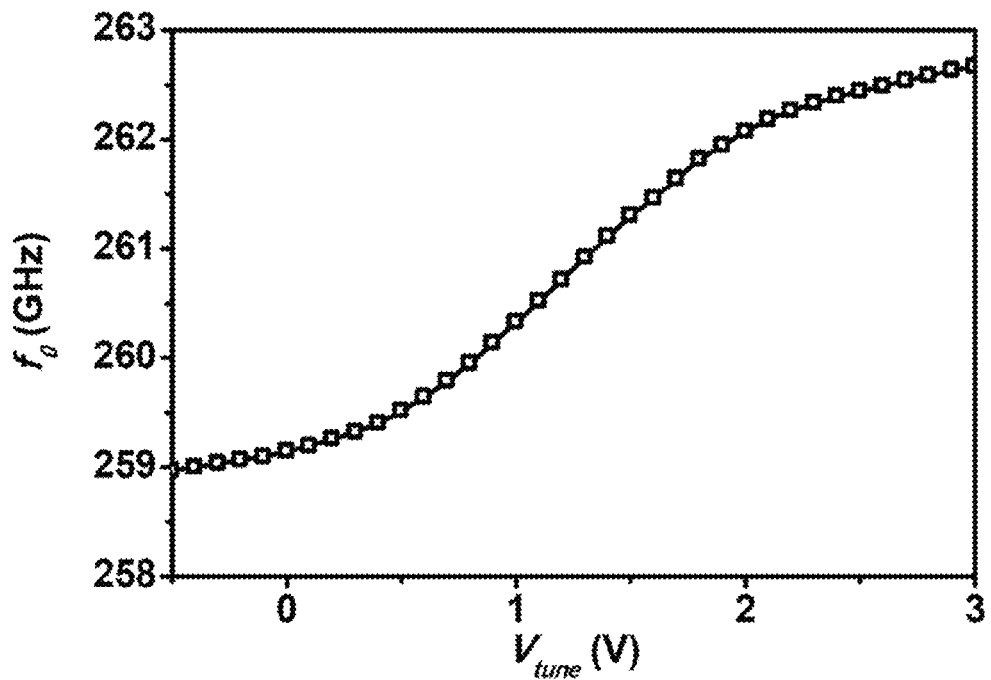
FIG. 33 is a graph of the measured frequency tuning range of the radiated signal.

The setup used to measure the radiation frequency and spectrum is shown in FIG. 31. The modulation function of the chip was first turned off. The radiation from the chip was received by a diagonal horn antenna (gain=25 dBi) cascaded by a VDI WR-3.4 even-harmonic mixer (EHM). The diode-based mixer was first forward biased with a 10 μA current to operate in the direct power detection mode. Its output response was much faster than that of the calorimeter, which greatly helps the initial silicon lens-to-chip alignment. Next, through a PMP-MD4A diplexer, an LO signal was fed into the harmonic mixer. The input radiation signal was mixed with the 16-th harmonic of the LO signal, thus down converted to a low frequency signal ($f_{IF} \approx 1$ GHz). The IF signal was measured by a spectrum analyzer after amplified by an LNA (gain ≈30 dB). The chip radiation frequency is given by $f_{RF}=N \cdot f_{LO} \pm f_{IF}$ (N=16), and in practice, the input radiation signal can also be mixed with other LO harmonic. In the measurement, the value of N was determined by the fact that $f_{IF}$ is shifted by 160 MHz if $f_{LO}$ is intentionally changed by 10 MHz. When $f_{LO}$ is 16.19 GHz, the measured IF spectrum around 1 GHz is obtained (FIG. 32). This gives a measured radiation frequency of 260 GHz. FIG. 32 also shows the measured phase noise spectrum from 500 kHz to 5 MHz. At 1-MHz offset, the phase noise is −78.3 dBc/Hz. In FIG. 10, there are a pair of small-value varactors inside each self-feeding oscillator. By changing the varactor bottom plate bias, $V_{tune}$, the measured radiation frequency of the chip is changed by 3.7 GHz, shown in FIG. 33.

Figure 34:
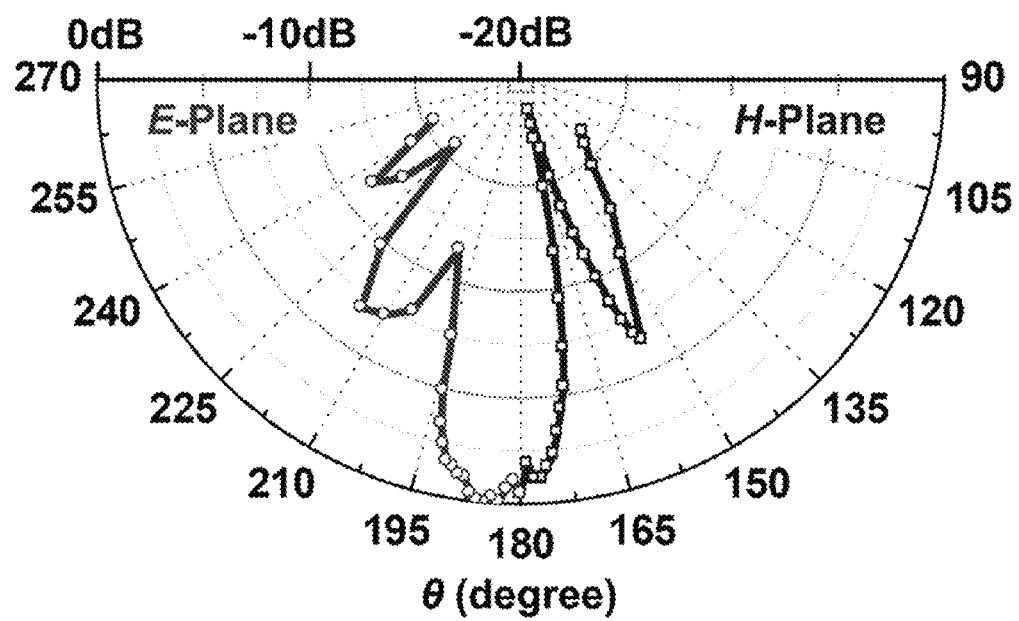
FIG. 34 is a chart showing the measured radiation pattern of the 260-GHz signal source.

The aperture diameter of the horn, $D_h$, was 5.6 mm, which resulted in a minimum far-field distance of 54 mm in free space ($2 D_h^2/\lambda_0$). Due to the silicon lens with a radius of 5 mm (equivalent to $5 \cdot = \sqrt{\epsilon_{Si}} 17$ mm in free space), the distance between the horn antenna and the silicon lens surface should be larger than 37 mm. In the measurements, it was 40 mm (45 mm from the horn to the chip antenna). Next, the radiation pattern was characterized by rotating the chip in the azimuth φ and elevation θ directions (FIG. 31) with a set of servo motors. The measured normalized intensity, $F(\theta, \phi)$, in the E-plane (φ=0) and H-plane (φ=π/2) is shown in FIG. 34. The directivity of the chip with the backside radiation (θ=) was determined by:

$$D_0 = 4\pi \frac{F(\theta_0, \varphi_0)}{\int_0^{2\pi}\int_0^{\pi} F(\theta,\varphi)\sin\theta d\theta d\varphi} \approx 4\pi \frac{F_{\theta=\pi}}{\frac{2\pi}{M}\frac{\pi}{2N}\sum_{j=1}^{M}\sum_{i=1}^{N} F(\theta_i, \varphi_j)\sin\theta_i}, \quad (22)$$

where M, the number of measured pattern cuts, equals 2. For highly-directive antennas, the two orthogonal planes (E-plane and H-plane) are adequate. In (22), N, which equals 90, is the number of measured points within each pattern cut $$\left(\Delta\theta = \left(\frac{\pi}{2N}\right)\left(\frac{180}{\pi}\right) = 1°\right).$$

Figure 35:
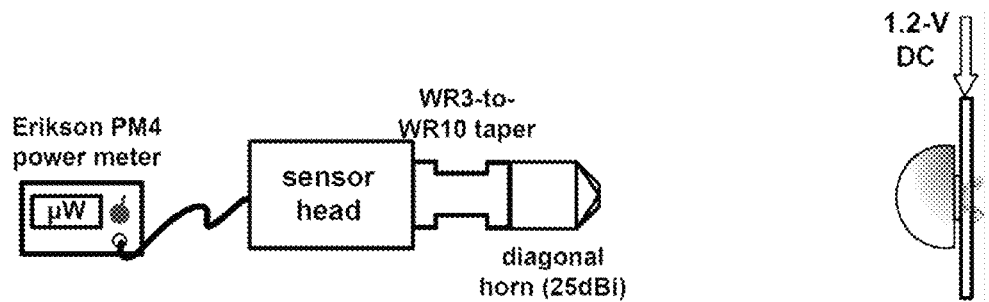
FIG. 35 is a block diagram of a testing setup for the accurate radiation power measurement of a 260-GHz radiator array.

The measured directivity of the chip is 15.2 dBi. The higher side lobes in the measurement cause the 1.4 dB directivity degradation compared to the simulation in FIG. 27B. Next, an Erikson PM4 calorimeter was used to accurately measure the radiation power (FIG. 35). (The effect of the chip infrared radiation was examined by rotating the powered chip by 90°, in order to preserve the infrared radiation but block the coupling at 260 GHz using the polarization orthogonality of the antennas. The thermal effect was not observed, which may due to the active cooling on the other side of the PCB. The power measurement was also calibrated using the sub-harmonic mixer in its direct-power-detection mode (FIG. 31)). At the same far-field distance, the measured power was 48 W, which gives an EIRP of 15.7 dBm based on the Früs equation. This is equivalent to a 37 mW isotropic source for the same radiation power density. The actual radiation power of the source was ($EIRP_{dBm}$−$Directivity_{dB}$), which was 0.5 dBm, or 1.1 mW in the measurement.

Figure 36:
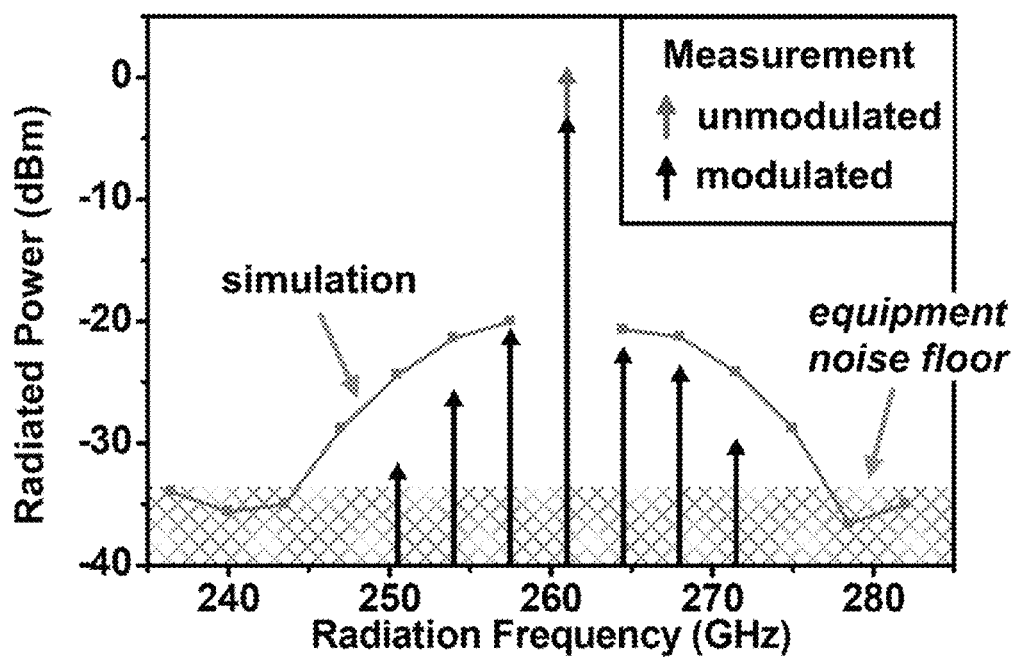
FIG. 36 is a graph showing the measured radiation spectrum of the 260-GHz radiator array with and without narrow-pulse modulation.
Figure 38:
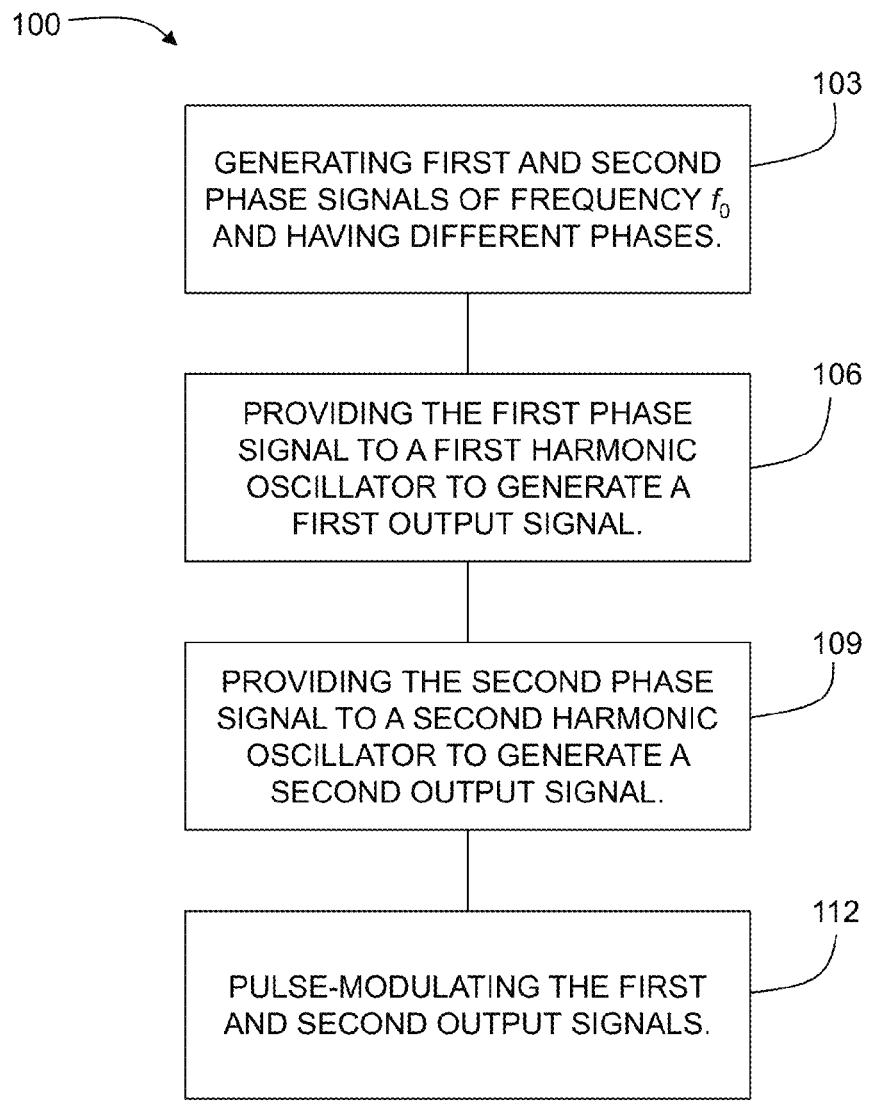
FIG. 38 depicts a method according to an embodiment of the present disclosure.

Finally, the narrow pulse modulation of the chip was turned on by injecting a 3.5 GHz sinusoidal signal into the modulation port. Then, by sweeping the LO frequency $f_{LO}$ of the mixer, the frequencies of other side bands were found. Although the power of each side band cannot be measured separately by the power meter, it was still estimated using the mixer, regarding its relative difference from the single-tone power measured before. The measured radiation spectrum is plotted in FIG. 36. In total, 6 side bands were measured above the noise floor. They were spaced by 3.5 GHz, which gives a null-to-null radiation bandwidth of 21 GHz. FIG. 36 also presents the simulated radiation spectrum, which has a bandwidth as high as 40 GHz. In the measurement, the radiation frequency can also be continuously changed by 3.7 GHz as is described earlier. Therefore, the entire spectrum is shifted by the same amount, with moving range overlap between neighboring sidebands. This means the radiation from our 260 GHz array continuously covers a bandwidth of 24.7 GHz. In FIG. 36, the lowest measured power of the side bands was −32 dBm (0.6 µW), which is higher than the typical average power of the incoherent blackbody source inside a Fourier transform spectroscopy system (0.1 µW). This indicates the feasibility of integrating the 260-GHz radiator array into an FTIR-based spectrometer.

Embodiments of the self-feeding oscillator structure described in this disclosure achieve the optimum gain conditions for the fundamental oscillation, and therefore maximizes the device voltage swings for the nonlinear frequency conversion ($f_0$-to-$2f_0$). Meanwhile, by blocking the negative-feedback loop and the path to the lossy gate load for the signal at $2f_0$, the available harmonic power from the transistor is greatly improved. The CMOS prototype deploying 8 self-feeding units demonstrates an EIRP of 15.7 dBm and radiated power of 1.1 mW. Meanwhile, the narrow-pulse modulation scheme of the chip effectively broadens the radiation spectrum to 24.7 GHz. The performance of the chip is summarized in Table I (FIG. 37), along with a comparison with other state-of-the-art sub-millimeter-wave CMOS signal sources. The disclosed 260-GHz radiator array embodiment achieved the highest radiated power, EIRP, and bandwidth in the table.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A device for signal generation, comprising:
    a quadrature oscillator having a first phase output at a first phase and a second phase output at a second phase which is different from the first phase;
    a coupled oscillator pair operating at a fundamental frequency, comprising:
        a first oscillator connected to the first phase output of the quadrature oscillator and configured to provide a first signal at a first output, wherein the first signal comprises a harmonic of the fundamental frequency; and
        a second oscillator connected to the second phase output of the quadrature oscillator and configured to provide a second signal at a second output, wherein the second signal comprises a harmonic of the fundamental frequency which is the same harmonic as the first signal, and the first and second signals are differential signals;
    a first antenna in electrical communication with the first output;
    a second antenna in electrical communication with the second output; and a switch for pulse modulation of the first and second signals, the switch connecting the first output to the first antenna and the second output to the second antenna.

2. The device of claim 1, further comprising a pulse generator configured to operate the switch such that the first and second signals are modulated according to pulses from the pulse generator.

3. The device of claim 1, wherein the first and second signals comprise an even harmonic of the fundamental frequency.

4. The device of claim 1, wherein the quadrature oscillator is configured such that the first phase is 90° from the second phase at the fundamental frequency, and the first and second signals of the coupled oscillator pair comprise a second harmonic of the fundamental frequency.

5. The device of claim 1, wherein the switch comprises varactors configured to connect the first and second signals to a virtual ground.

6. The device of claim 1, wherein each oscillator of the coupled oscillator pair comprises:
   a coupled pair of transistors configured to operate at the fundamental frequency, wherein a gate of each transistor is connected to a drain of the transistor by a feedback transmission line, and wherein the feedback transmission lines are configured to couple the pair of transistors in an out-of-phase coupling mode; and
   an output node connected to the drain of each transistor of the coupled pair of transistors by an output transmission line tuned to a harmonic of the fundamental frequency, wherein the output node is configured to suppress the fundamental frequency.

7. The device of claim 1, wherein the first and second antennas are slot antennas.

8. The device of claim 1, wherein the fundamental frequency is greater than 100 GHz.

9. The device of claim 1, wherein the fundamental frequency is 130 GHz.

10. A system for signal generation, comprising:
   four quadrature oscillators, each quadrature oscillator configured to operate at a fundamental frequency, and each quadrature oscillator having a 0° phase output, a 90° phase output, a 180° phase output, and a 270° phase output;
   four radiator units, each radiator unit comprising:
      an oscillator pair operating at the fundamental frequency, a first oscillator of the oscillator pair connected to two of the quadrature oscillators at the 90° phase output and 270° phase output, respectively, and a second oscillator of the oscillator pair connected to the same two quadrature oscillators at the 0° phase output and the 180° phase output, respectively; the oscillator pair configured to generate differential signals at a second harmonic of the fundamental frequency;
      two antennas, each antenna in electrical communication with a corresponding oscillator of the oscillator pair; and
      a switch connecting each oscillator of the oscillator pair to a respective antenna of the two antennas; and
   wherein the quadrature oscillators and radiator units form a ring of alternating quadrature oscillators and radiator units such that the oscillator pairs and quadrature oscillators are coupled.

11. The system of claim 10, wherein the fundamental frequency is greater than 100 GHz.

12. The system of claim 10, wherein the fundamental frequency is 130 GHz.

13. A method for generating a broadband signal, comprising:
   generating a first phase signal and a second phase signal using a linking oscillator;
      wherein the first and second phase signals have a same fundamental frequency and a phase of the first phase signal is different than a phase of the second phase signal;
   coupling a first harmonic oscillator to the first phase signal to produce a first output signal at a harmonic of the fundamental frequency;
   coupling a second harmonic oscillator to the second phase signal to produce a second output signal at a harmonic of the fundamental frequency which is the same as the harmonic of the first output signal;
   wherein the phase of the first phase signal and the phase of the second phase signal are selected such that the first and second output signals are differential signals; and
   pulse modulating the first and second output signals using a switch, wherein the switch connects the first output signal to a first antenna and the second output signal to a second antenna.

14. The method of claim 13, wherein the first and second phase signals differ by 90°, and wherein the first and second output signals are at a second harmonic of the fundamental frequency.

* * * * *